US011734315B2

(12) United States Patent
Morfonios et al.

(10) Patent No.: US 11,734,315 B2
(45) Date of Patent: *Aug. 22, 2023

(54) METHOD AND SYSTEM FOR IMPLEMENTING EFFICIENT CLASSIFICATION AND EXPLORATION OF DATA

(71) Applicant: Oracle International Corporation, Redwood Shores, CA (US)

(72) Inventors: Konstantinos Morfonios, Dublin, CA (US); Mirza Mohsin Beg, Foster City, CA (US); Jae Young Yoon, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 17/379,887

(22) Filed: Jul. 19, 2021

(65) Prior Publication Data

US 2021/0342369 A1      Nov. 4, 2021

Related U.S. Application Data

(63) Continuation of application No. 16/185,588, filed on Nov. 9, 2018, now Pat. No. 11,068,510, which is a
(Continued)

(51) Int. Cl.
*G06F 16/28* (2019.01)
*G06F 16/13* (2019.01)
(Continued)

(52) U.S. Cl.
CPC ............ *G06F 16/285* (2019.01); *G06F 11/14* (2013.01); *G06F 16/13* (2019.01);
(Continued)

(58) Field of Classification Search
CPC ........ G06F 16/285; G06F 16/23; G06F 16/13; G06F 16/1734; G06F 16/355; G06F 11/14
(Continued)

(56) References Cited

U.S. PATENT DOCUMENTS 8,396,840 B1 *   3/2013   McHugh ................. G06F 3/067
                                                    707/689
8,468,134 B1 *   6/2013   McHugh ........... G06F 16/24556
                                                    707/688
(Continued)

FOREIGN PATENT DOCUMENTS

| CN | 102365637 A | 2/2012 |
| CN | 102902764 A | 1/2013 |
| CN | 103399855 A | 11/2013 |

OTHER PUBLICATIONS

De S K et al: "Clustering web transactions using rough approximation", Fuzzy Sets and Systems, Elsevier Science Publishers, Amsterdam, NL, vol. 148, No. 1, Nov. 16, 2004 (Nov. 16, 2004), pp. 131-138.

*Primary Examiner* — Dung K Chau
(74) *Attorney, Agent, or Firm* — Invoke

(57) ABSTRACT

Disclosed is a system, method, and computer program product for analyzing sets of data in an efficient manner, such that analytics can be effectively performed over that data. Classification operations can be performed to generate groups of similar log records. This permits classification of the log records in a cohesive and informative manner.

18 Claims, 37 Drawing Sheets

Related U.S. Application Data continuation of application No. 14/863,994, filed on Sep. 24, 2015, now Pat. No. 10,127,301.

(60) Provisional application No. 62/056,073, filed on Sep. 26, 2014.

(51) Int. Cl.
  *G06F 16/23* (2019.01)
  *G06F 16/35* (2019.01)
  *G06F 16/17* (2019.01)
  *G06F 11/14* (2006.01)

(52) U.S. Cl.
  CPC .......... *G06F 16/1734* (2019.01); *G06F 16/23* (2019.01); *G06F 16/355* (2019.01)

(58) Field of Classification Search
  USPC ........................................ 707/737
  See application file for complete search history.

(56) References Cited

U.S. PATENT DOCUMENTS

| | | | |
|---|---|---|---|
| 8,782,219 B2 | 7/2014 | Morfonios et al. | |
| 2007/0104369 A1* | 5/2007 | Weatherhead | H04H 60/59 382/173 |
| 2009/0261158 A1* | 10/2009 | Lawson | G07D 7/0047 235/379 |
| 2009/0293121 A1* | 11/2009 | Bigus | G06F 21/316 726/22 |
| 2012/0317112 A1* | 12/2012 | Naito | G06Q 10/10 707/E17.046 |
| 2013/0066869 A1* | 3/2013 | Kusaka | G06F 11/0715 707/E17.046 |
| 2015/0293964 A1 | 10/2015 | Morfonios et al. | |
| 2015/0356094 A1* | 12/2015 | Gorelik | G06F 16/2457 707/748 |
| 2015/0370885 A1* | 12/2015 | Kushmerick | H04L 41/40 707/737 |

* cited by examiner

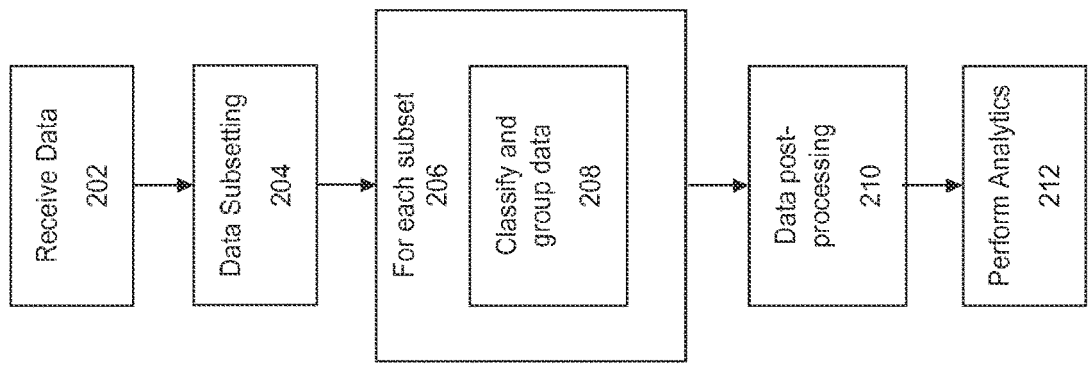

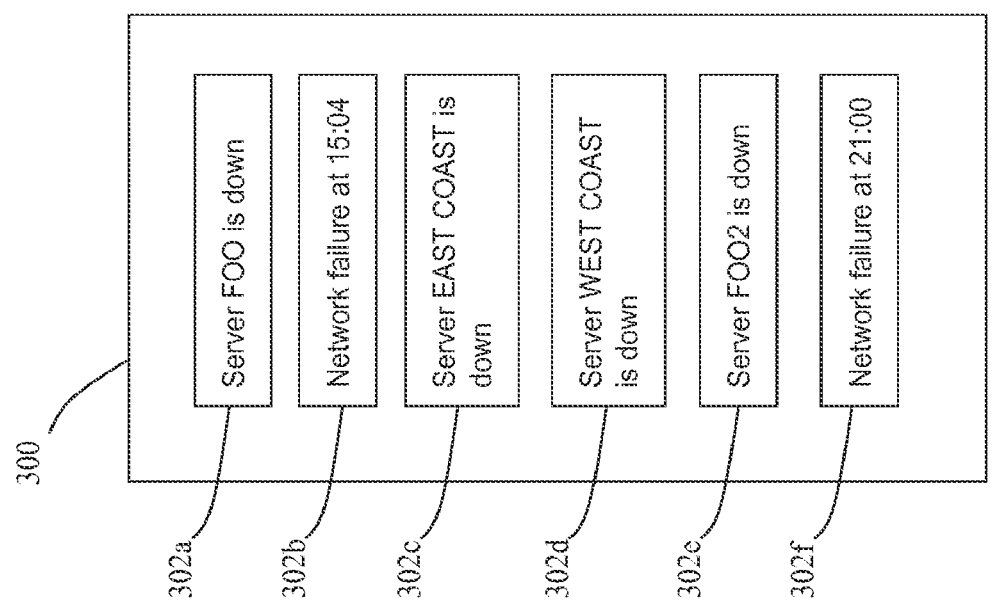

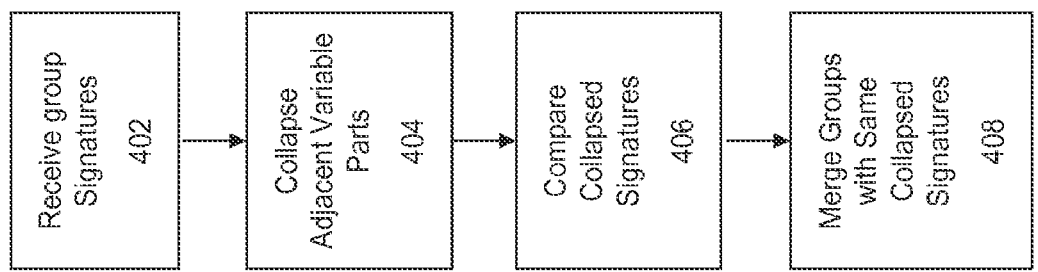

| GROUP ID: 1 | | GROUP ID: 3 |
| --- | --- | --- |
| SAMPLE: Server FOO is down | | SAMPLE: Server EAST COAST is down |
| SIGNATURE: Server ... is down | | SIGNATURE: Server ... is down |
| Count: 2 | | Count: 2 |

Fig. 5A

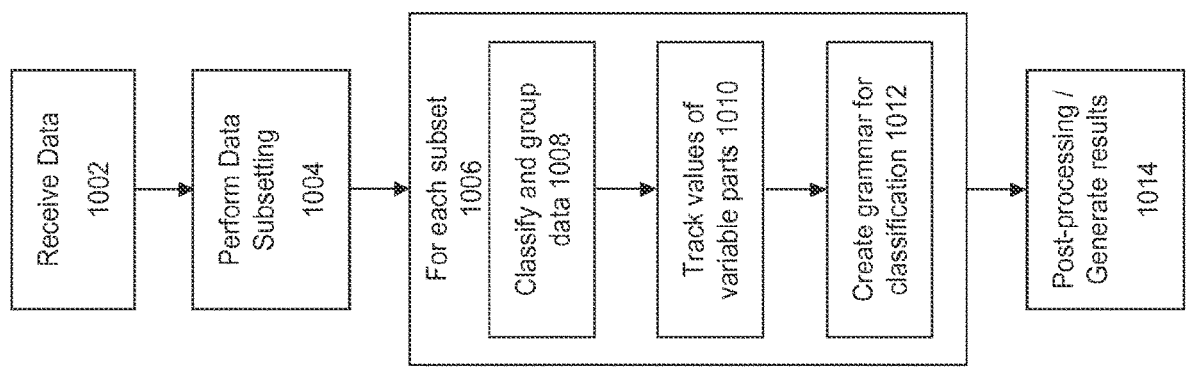

Input
[RJob Step 189] ERROR emdrep.jobs logp.251 - [EM-00162] Error while getting command/step RequestNotificationCommand/notifyUsers (189) for job SSAEMAILNOTIFYUSR:SYSMAN: oracle.sysman.ssa.service.jobs.commands.RequestNotificationCommand
java.lang.ClassNotFoundException: oracle.sysman.ssa.service.jobs.commands.RequestNotificationCommand
    at weblogic.utils.classloaders.GenericClassLoader.findLocalClass(GenericClassLoader.java:297)
    at weblogic.utils.classloaders.GenericClassLoader.findClass(GenericClassLoader.java:270)
    at weblogic.utils.classloaders.ChangeAwareClassLoader.findClass(ChangeAwareClassLoader.java:64)
    at java.lang.ClassLoader.loadClass(ClassLoader.java:423)
    at java.lang.ClassLoader.loadClass(ClassLoader.java:356)
    ...

Output
[RJob Step ..., ERROR emdrep.jobs logp.251 - [EM-00162] Error while getting command/step ... ... for job ...
    at weblogic.utils.classloaders.GenericClassLoader.findLocalClass(GenericClassLoader.java:297)
    at weblogic.utils.classloaders.GenericClassLoader.findClass(GenericClassLoader.java:270)
    at weblogic.utils.classloaders.ChangeAwareClassLoader.findClass(ChangeAwareClassLoader.java:64)
    at java.lang.ClassLoader.loadClass(ClassLoader.java:423)
    at java.lang.ClassLoader.loadClass(ClassLoader.java:356)
    ...

METHOD AND SYSTEM FOR IMPLEMENTING EFFICIENT CLASSIFICATION AND EXPLORATION OF DATA

INCORPORATION BY REFERENCE; DISCLAIMER

Each of the following applications are hereby incorporated by reference: application Ser. No. 16/185,588 filed on Nov. 9, 2018; application Ser. No. 14/863,994 filed on Sep. 24, 2015; application Ser. No. 62/056,073 filed on Sep. 26, 2014. The Applicant hereby rescinds any disclaimer of claim scope in the parent application(s) or the prosecution history thereof and advises the USPTO that the claims in this application may be broader than any claim in the parent application(s).

BACKGROUND AND SUMMARY

Many types of computing systems and applications generate vast amounts of data pertaining to or resulting from the operation of that computing system or application. These vast amounts of data are stored into collected locations, such as log files/records, which can then be reviewed at a later time period if there is a need to analyze the behavior or operation of the system or application.

Server administrators and application administrators can benefit by learning about and analyzing the contents of the system log records. However, mining knowledge from log files can be a very challenging task for many reasons. One challenge is that the size of the log data can be very large, making it inefficient and difficult to analyze the large number of records for the specific information items of interest. This may be particularly the case if the interesting entries in the log data are relatively sparse within the larger set of data—which is often the situation since severe problems are usually rare. However, when such problems appear they tend to require immediate action to be taken, which emphasizes the importance of being able to efficiently identify the rare or sparse records of interest within the overall large set of log data. Moreover, interesting trends may be hidden in sequences of events. The raw evidence to discover these specific sequences of events may exist in the log files, but combining the individual pieces of information together from among the vast set of log data to draw a meaningful conclusion can be a particularly non-trivial task.

The aforementioned problems become even more pronounced in large and complex ecosystems, such as complex enterprise-class database management systems. Such systems may produce very large volumes of data stored in hardware logs, operating system logs, application logs, application server logs, database server logs, and any other type of log that monitors the behavior of a large production system. Furthermore, a similar situation will also exist in a cloud environment, where multiple customers are sharing the same physical resources in a virtualized fashion. Mining knowledge from such log files may be comparable to looking for a needle in a haystack.

Therefore, there is a need for an improved approach that can be taken to analyze vast quantities of data, such as log data that are generated by computing systems and applications.

Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIG. 2A shows a flowchart of a process for implementing some embodiments of the invention.

FIG. 4 shows the flowchart of one possible approach that can be taken to perform data post-processing.

FIGS. 5A-C illustrate a process to perform data post-processing.

FIG. 10B shows a flowchart of an approach to classify URL data with auto-generated regular expressions.

FIG. 11A illustrates the scenario exceptions are identified that are similar but not necessarily the same for traces.

DETAILED DESCRIPTION

Figure 1:
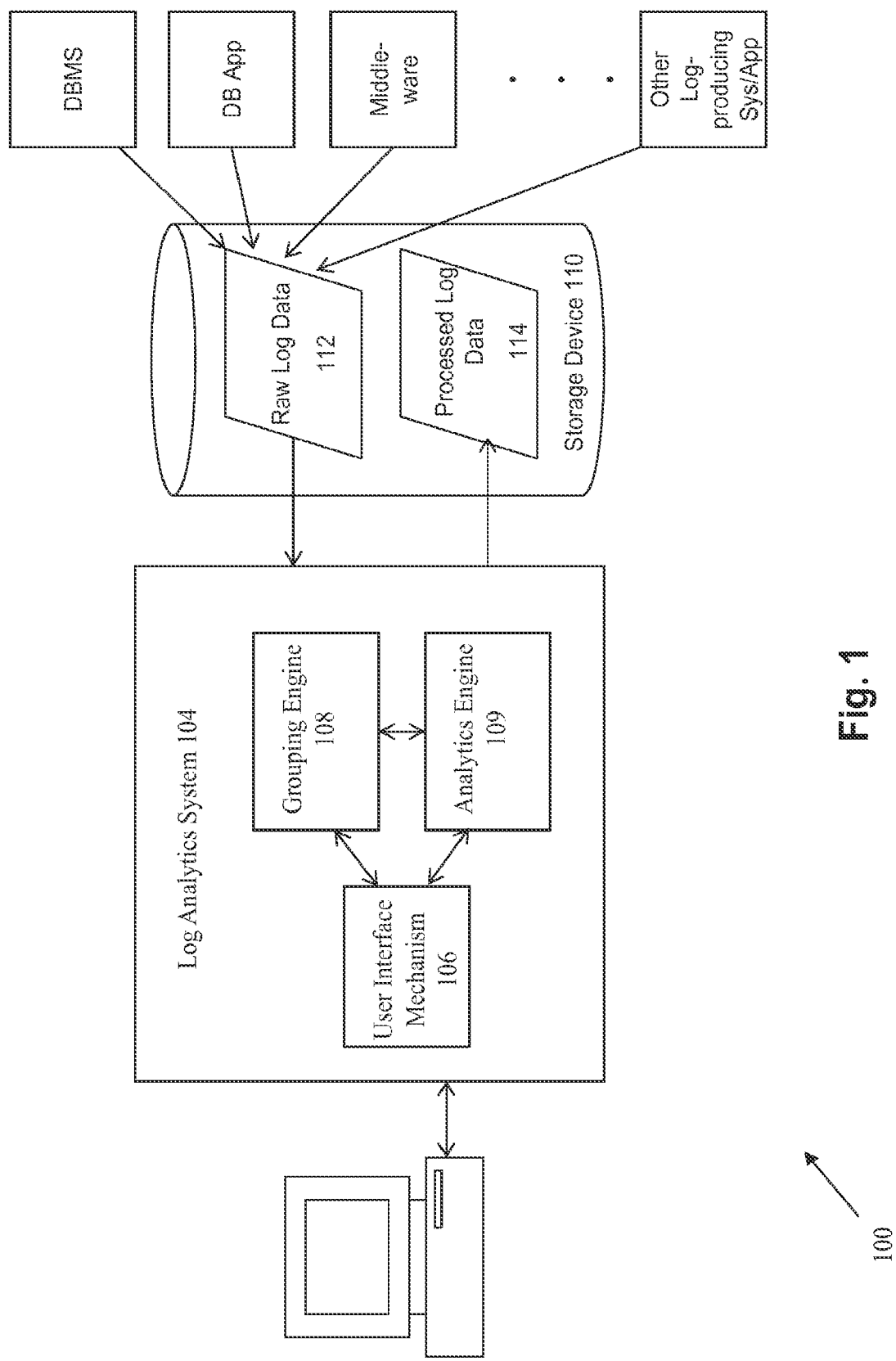
FIG. 1 illustrates an example system which may be employed in some embodiments of the invention to implement an approach for analyzing and classifying sets of data.

As noted above, many types of computing systems and applications generate vast amounts of data pertaining to or resulting from the operation of that computing system or application. These vast amounts of data are then stored into collected locations, such as log files/records, which can be reviewed at a later time period if there is a need to analyze the behavior or operation of the system or application.

Embodiments of the present invention provide an approach for analyzing sets of data in an efficient manner, such that analytics can be effectively performed over that data. In some embodiments, classification operations are performed to generate groups of similar log records. This permits classification of the log records in a cohesive and informative manner. In addition, group-based delta operations can be performed over the groups of the log data to detect differences and similarities between the different groups of data. Subsequences can also be identified within the set of grouped data. Various types of analytics can be applied to the classified data.

While the below description may describe the invention by way of illustration with respect to "log" data, the invention is not limited in its scope only to the analysis of log data, and indeed is applicable to wide range of data types. Therefore, the invention is not to be limited in its application only to log data unless specifically claimed as such. In addition, the following description may also interchangeably refer to the data being processed as "records" or "messages", without intent to limit the scope of the invention to any particular format for the data.

In general, classification operations can be performed over log data with the understanding that the log messages printed in a log file are typically not arbitrary text. They do not look like the body of an e-mail message, or a paragraph in a book. They are typically machine generated and follow a strict format. Many, most, or all of such messages typically include a skeleton/constant part and a variable part. Here are a few examples:

[M01] Created 1 resources for pool sysman-opss-ds, out of which 1 are available and 0 are unavailable.
[M02] Created 1 resources for pool emgc-sysman-pool, out of which 1 are available and 0 are unavailable.
[M03] Connection for pool emgc-sysman-pool has been closed.
[M04] 33% of the total memory in the server is free
[M05] Connection for pool mds-owsm has been closed.
[M06] deleting log file: diagnostic-144.log, size: 10467701 bytes
[M07] Connection for pool mds-sysman_mds has been closed.
[M08] deleting log file: diagnostic-201.log, size: 2154623 bytes
[M09] Created 1 resources for pool mds-owsm, out of which 1 are available and 0 are unavailable.
[M10] 45% of the total memory in the server is free Despite their differences, it is possible to group the messages in the previous example into four groups:

[G1] Created 1 resources for pool . . . out of which 1 are available and 0 are unavailable.
[G2] Connection for pool . . . has been closed.
[G3] . . . of the total memory in the server is free
[G4] deleting log file: . . . size: . . . bytes M01, M02, and M09 intuitively belong to group G1. The constant/skeletal part of these messages has been kept intact and the variable part has been replaced by " . . . ". Similarly messages M03, M05, and M07 belong to G2, M04 and M10 to G3, whereas M06 and M08 to G4.

Embodiments of the invention provide functionality that automates the aforementioned grouping process. The input is a list of messages and a similarity threshold (i.e., a parameter that affects the sensitivity of the algorithm). The output of the operation (hereinafter referred to as a "classify" operation) in some embodiments is a list of group-ids and a group structure. In the above example, the output in some embodiments would look as follows:

Group-id: G1, G1, G2, G3, G2, G4, G2, G4, G1, G3
Group (group-id, signature, sample, count):
<G1, "Created 1 resources for pool . . . out of which 1 are available and 0 are unavailable.", "Created 1 resources for pool sysman-opss-ds, out of which 1 are available and 0 are unavailable.", 3>,
<G2, "Connection for pool . . . has been closed.", "Connection for pool emgc-sysman-pool has been closed.", 3>,
<G3, " . . . of the total memory in the server is free", "33% of the total memory in the server is free", 2>,
<G4, "deleting log file: . . . size: . . . bytes", "deleting log file: EMGC_OMS1-diagnostic-144.log, size: 10467701 bytes", 2>

FIG. 1 illustrates an example system 100 which can be employed in some embodiments of the invention to implement an approach for analyzing and classifying sets of data. The system 100 includes one or more users at one or more user stations that use the system 100 to operate and interact with the log analytics system 104. The user station comprises any type of computing station that may be used to operate or interface with the log analytics system 104 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The log analytics system 104 comprises functionality that is accessible to users at the user stations, e.g., where log analytics system 104 is implemented as a set of engines or modules to perform grouping or analytics. A grouping engine 108 performs classification operations to group the raw log data 112. This grouping allows the system to perform, for example, deduplication of the log data. An analytics engine 109 can be used to analyze the grouped log data. Examples of such analytics include anomaly detection, sequence analysis, and forecasting. The user interface mechanism 106 generates the UI to display the classification and analysis results, and to allow the user to interact with the log analytics system.

The raw log data 112 processed by the log analytics system 104 may originate from any log-producing source location. For example, the raw log data 112 may originate from a database management system (DBMS), database application (DB App), middleware, or any other log-producing application or system.

The log analytics system 104 may receive instructions or work requests from users at the user stations to operate the system. For example, the log analytics system 104 may receive requests from a user at the user station to analyze raw log data 112 in a computer readable storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system.

FIG. 2A shows a flowchart of a process for implementing some embodiments of the invention. At 202, the log data is received for processing. The log data may originate from any log-producing source location, such as a database management system, database application, middleware, hardware logs, operating system logs, application logs, application server logs, database server logs, and any other type of log that monitors the behavior of a system or application.

At 204, data subsetting is performed. This action breaks up the log data into multiple subsets for processing. One reason for subsetting the data is to optimize processing for classifying the log data. For example, the log data can be separated into subsets based on the number of tokens within each individual log record. In this way, each log record within a specific subset of log records will be known to have the exact same number of tokens, and hence permit classification algorithms that rely upon this fact for processing.

In some embodiments, the log data can be processed independently of each other, so that any record is tokenized without reliance on the results of the tokenization of any other log record. For example, each of the log data can be separately reviewed to identify the number of tokens in that record, without requiring knowledge of the results of tokenization and token counting for other log records. In this way, each of the log data can be independently placed into different "buckets" based upon the number of tokens in that specific log data, where each bucket is associated with a specific number of tokens.

While the present illustrated examples show subsetting based upon a number of tokens in the log record, other types of subsetting may also be used, e.g., based at least in part upon the specific application or server that produces the records, the timestamp of the record, etc. Of course, one skilled in the art would also realize that the inventive concept disclosed herein is not reliant upon data subsetting, and indeed can be carried out in various embodiments even without separating the log data into different subsets.

Processing is performed at 206 for each subset of the log data. In particular, at 208, classification is performed to group the log data into groupings for the log data having sufficient similarities. This process is implemented to classify log records into either the same or different groups, e.g., based at least in part upon whether a "similarity value" meets a specified threshold level. In some embodiments, the similarity value corresponds to the degree of overlap between two sets of one or more records. For example, in the context of tokenized log data, the similarly value may pertain to the degree of overlap between two log records in terms of "token content" and "token position". Token content pertains to the content of individual tokens and/or combinations of multiple tokens. Token position pertains to the relative location, presence, and/or absence of particular tokens within the log data. In general, the similarly value is higher when two sets of log data have higher levels of correspondence for token content, token positions, and/or a combination of token content and positioning, whereas the similarly value is lower when there is less correspondence between the two sets of log data for these items.

After the log data has been classified into the appropriate groups, data post-processing may then be performed at 210 on the grouped data. For example, additional processing can be performed to further enhance the groupings, so that log data that were not initially grouped may nonetheless be placed into the same group upon further realization or identification of applicable grouping criteria. Any suitable type of enhancements may be performed upon the groupings. For example, enhancements can be implemented by comparing subsections of the messages, semantically tag data to understand the structure of a trace file, and/or collapsing of adjacent variable parts (as described in more detail below).

Analytics can then be performed at 212. Examples of such analytics include anomaly detection, sequence analysis, and forecasting. As an example of a type of anomaly detection that is usable with this approach, consider a certain type of log record that always appears at a consistent frequency at a consistent time of data. If this type of log record all of a sudden does not appear in the log data at the same frequency or time, then the administrator can be notified of an anomaly that may deserve attention as a symptom of a potential problem. The opposite situation may also constitute an actionable anomaly, where a certain type of log record just does not appear in the log data at all or only with great infrequency, but all of a sudden appears in the log data and/or with much greater frequency and/or at the wrong time of the day. This may point to an anomaly that indicates the presence of a system problem or security breach. Sequence analysis can be used to check for the presence of expected and/or unexpected sets and sequences of records within the log data. Forecasting can be used to predict likely status and situations when certain log types, groups, or sequences are detected in the log data. This can be used, for example, to predict the existence of a problem situation upon detection of a known sequence that has been correlated to problems in the past. By forecasting these situations, the administrator can preemptively resolve the possible problems even before they affect the operations of the system or manifest themselves as end-user visible symptoms or complaints. By using the grouping approach described herein, these analytics can be performed much more efficiently and/or effectively since (a) data deduplication is implemented which reduces complexity, and (b) textual data (log records) is transformed into integers (group-ids) which are easier to handle in a more efficient fashion.

One advantage of the above process is that distinct sets of data can potentially be processed in parallel, allowing for more efficient concurrent processing of the log data. For example, with regards to the subsetting process, this produces distinct sets of data that can potentially be processed in parallel, allowing for more efficient concurrent processing of the log data. In some embodiments, different processing entities are employed to tokenize the data sets, where a first processing entity tokenizes a first set of one or more records and a second processing entity tokenizes a second set of one or more records. In the context of classification, the processing to group the log data based upon similarity values can be performed independently for different sets of log data, e.g., where a first processing entity performs calculations to classify a first log record and a second entity independently performs the calculations to classify a second log record. The parallel classification activities may end up grouping the log records into the same or different groups. As used herein, the term "processing entity" comprises any type of entity that can be used to process work in a computing system, such as but not limited to, processes, threads, tasks, servers, nodes, or server processes.

As noted above, data subsetting is performed upon the log data in some embodiments of the invention. This approach splits all the input messages into vectors of tokens or words (referred to collectively herein as "tokens"). For example, message M01

[M01] Created 1 resources for pool sysman-opss-ds, out of which 1 are available and 0 are unavailable.

will be split as <"Created", "1", "resources", "for", "pool", "sysman-opss-ds,", "out", "of", "which", "1", "are", "available", "and", "0", "are", "unavailable.">

The vectors are then subset by length (or token count). The rationale is that one can assume in some cases that only messages with the same number of tokens can belong to the same group.

Figure 2B:
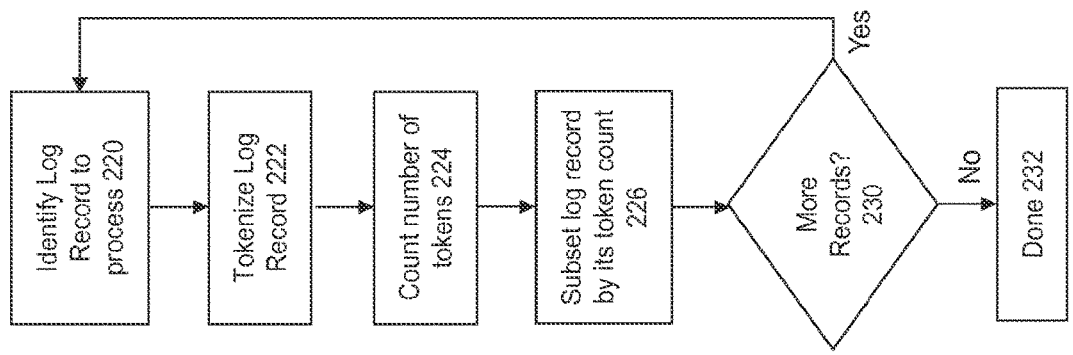
FIG. 2B shows a flowchart of a process for implementing data subsetting according to some embodiments of the invention.

FIG. 2B shows a flowchart of a process for implementing data subsetting according to some embodiments of the invention, where the number of tokens in a given log record is used to subset the data. At 220 of the process, identification is made of the log record to process. In some embodiments, the input comprises an array of log records from a given log file.

At 222, the log record is tokenized. In some embodiments, the tokenization process generates tokens equivalent to the tokens in the log record. Any suitable delimiter can be used to tokenize the log record. For normal textual data, the delimiter may be, for example, spaces or new lines. Other types of data may use different delimiters. For example, URL-based data may use symbols such as "/" or "\" as a delimiter. In certain tokenizers, one might decide not to split tokens within quotes, or to collapse multiple white spaces and use them as a single delimiter. It is noted that the inventive concepts disclosed herein are not dependent upon any specific approach taken in the tokenizer to split the log records. Of course, the quality of the grouping results may depend in some part on the tokenizer (e.g., URLs vs. log records vs. stack traces).

At 224, a count is performed for the number of tokens in the log record. At 226, the log record is then placed into the appropriate subset according to the number of tokens in the record.

A check is made at 230 whether there are any more records to process. If so, then the process returns back to 220 to select another record to process. If not, then the process ends at 232.

For a given subset S, the approach in some embodiments performs classification/grouping by finding the first message vector V that is still unclassified and creating a new group G.

A similarity value is then calculated between V and each of the still unclassified vectors in S. Any suitable approach can be taken to implement the similarity value that corresponds to a measure of the degree of overlap between the vectors, corresponding to the level of differences and/or similarities between the vectors. For example, some embodiments use a "hamming distance" as the similarly value, where the hamming distance between two strings corresponds to the number of positions at which the corresponding symbols are different. The hamming distance therefore measures the number of substitutions needed to change one string into the other, and for binary strings a and b the hamming distance can be calculated by determining the number/percentage of ones from performing an XOR operation on a and b. In some embodiments, a token-based hamming approach is employed to calculate the hamming distance. It is noted, however, that other types of similarity values may also be used in place of hamming distances. For example, similarity values may be used that do not depend upon token ordering or which weight certain positions in the vector/string greater than other positions (e.g., where matching/nonmatching tokens at beginning of the string are weighted greater than tokens at the end of the string).

All the messages whose similarity value/hamming distance is small enough (according to the similarity threshold that is passed as input) is classified into the same group G. At this point, a signature is generated for the group, which can be a form of regular expression that describes all the messages in G, and a count is made of the number of messages in G. These actions are performed if there are any more unclassified vectors in S. When they are all processed, another subset S' is chosen, and the same actions are executed. When all subsets are processed, the classification results are returned.

Figure 2C:
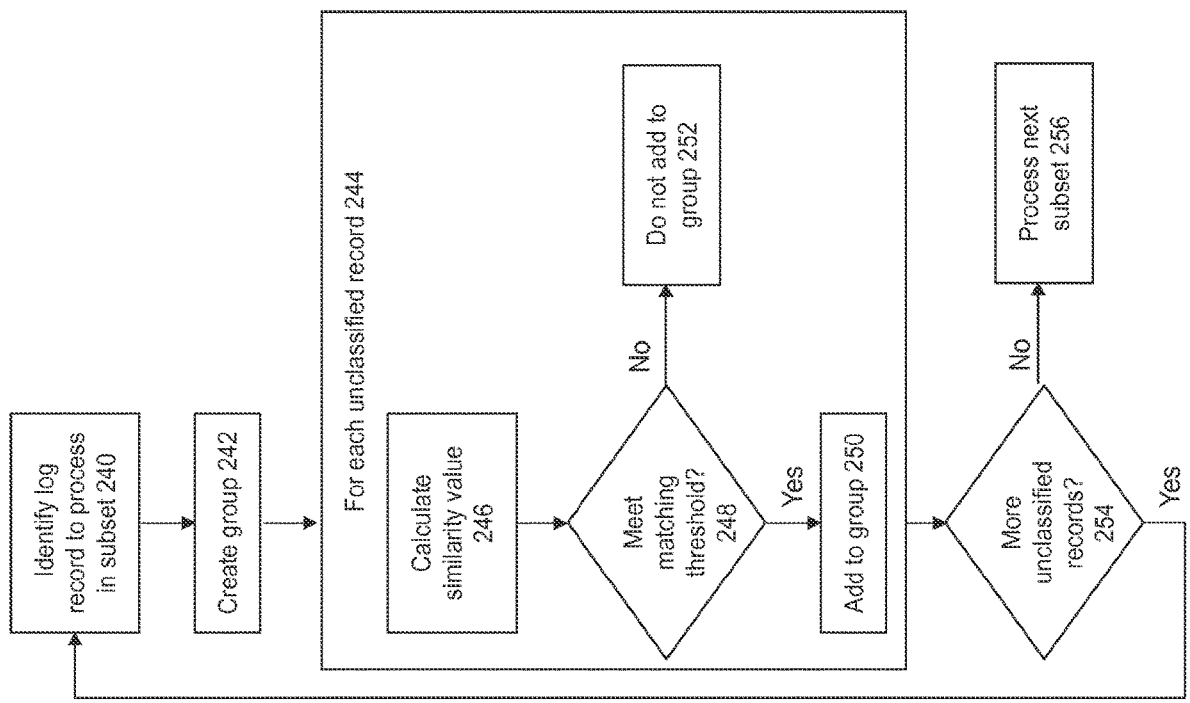
FIG. 2C shows a flowchart of a process for performing these classification and grouping actions according to some embodiments of the invention.

FIG. 2C shows a flowchart of a process for performing these classifications and grouping actions according to some embodiments of the invention. At 240, a log record within a subset is identified for processing. At 242, a new group is created for that log record. For this new group G, the corresponding message is set as its sample message.

The processing actions of 244 are performed for each unclassified record in the group. At 246, the similarity value is calculated between the sample log record in the group and each of the still unclassified vectors in the subset. As noted above, a token-based hamming approach is employed to calculate the similarity value. At 248, a determination is made as to whether the similarity value expresses a measure of similarity that meets a minimum similarity threshold. Any appropriate approach can be taken to transform a hamming distance between two log records into a percentage that expresses a measure of similarity of the two log records. An example of such a formula could be $100*(n-h)/n$, where n denotes the number of tokens in each of the log records, and h represents the calculated hamming distance. For example, a minimum threshold of 60% similarity may be configured for the process. If the hamming distance calculation indicates a 59% similarity percentage, then the record is too dissimilar to be placed into the same group (252). On the other hand, if the hamming distance calculation indicates a 61% similarity percentage, then the record is similar enough to be placed into the same group (250).

After these actions have been taken for each record in the subset, a further determination is then made at 254 whether there are any unclassified records remaining in the subset. If so, then the process returns back to 240 to select another record to create a new group and to repeat the above actions to classify records to that group (if appropriate). If not, then the next subset is selected for processing at 256.

Figure 3B:
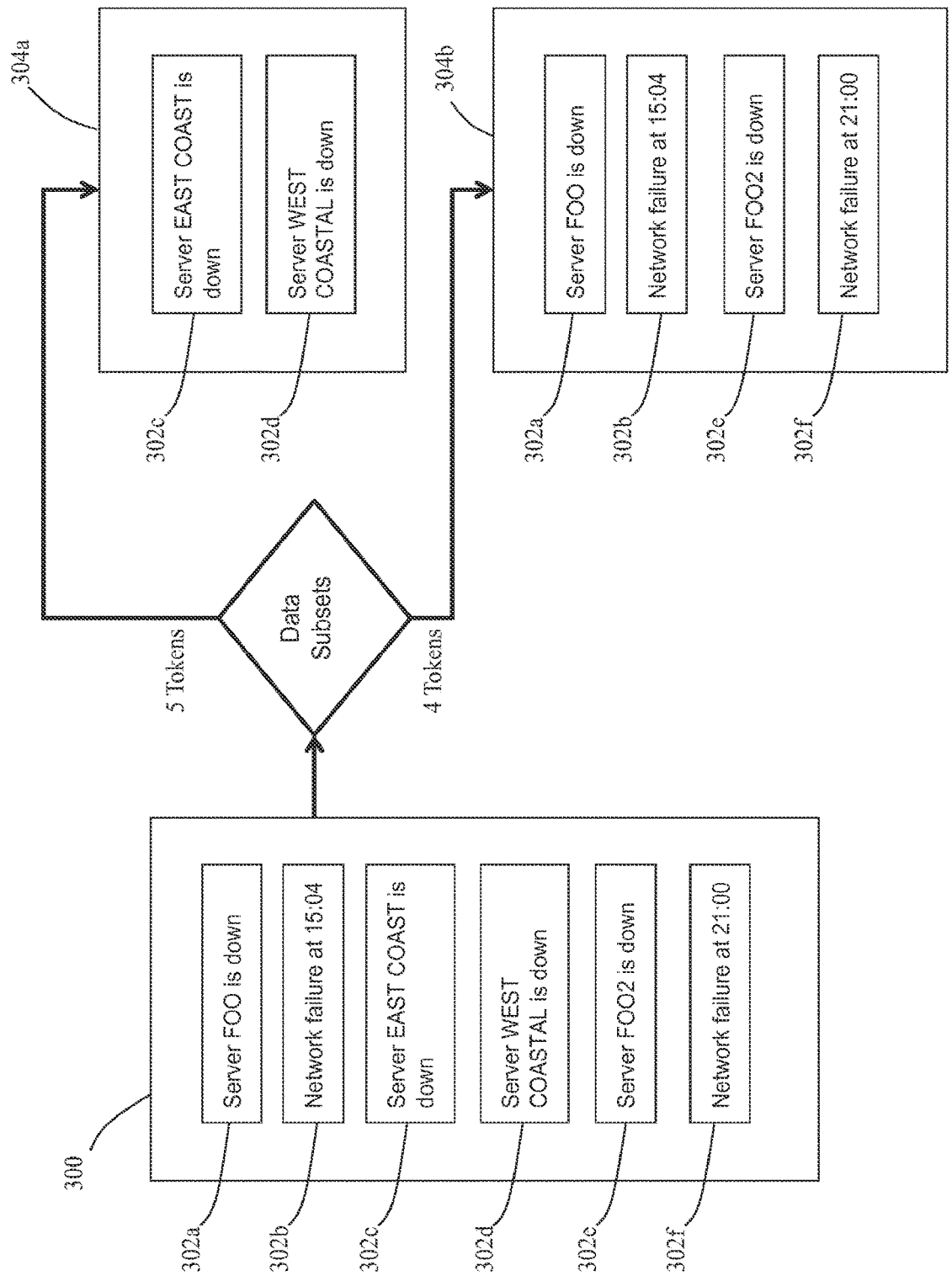
FIGS. 3A-N provide an illustrative example of the process to group the log data.
Figure 3C:
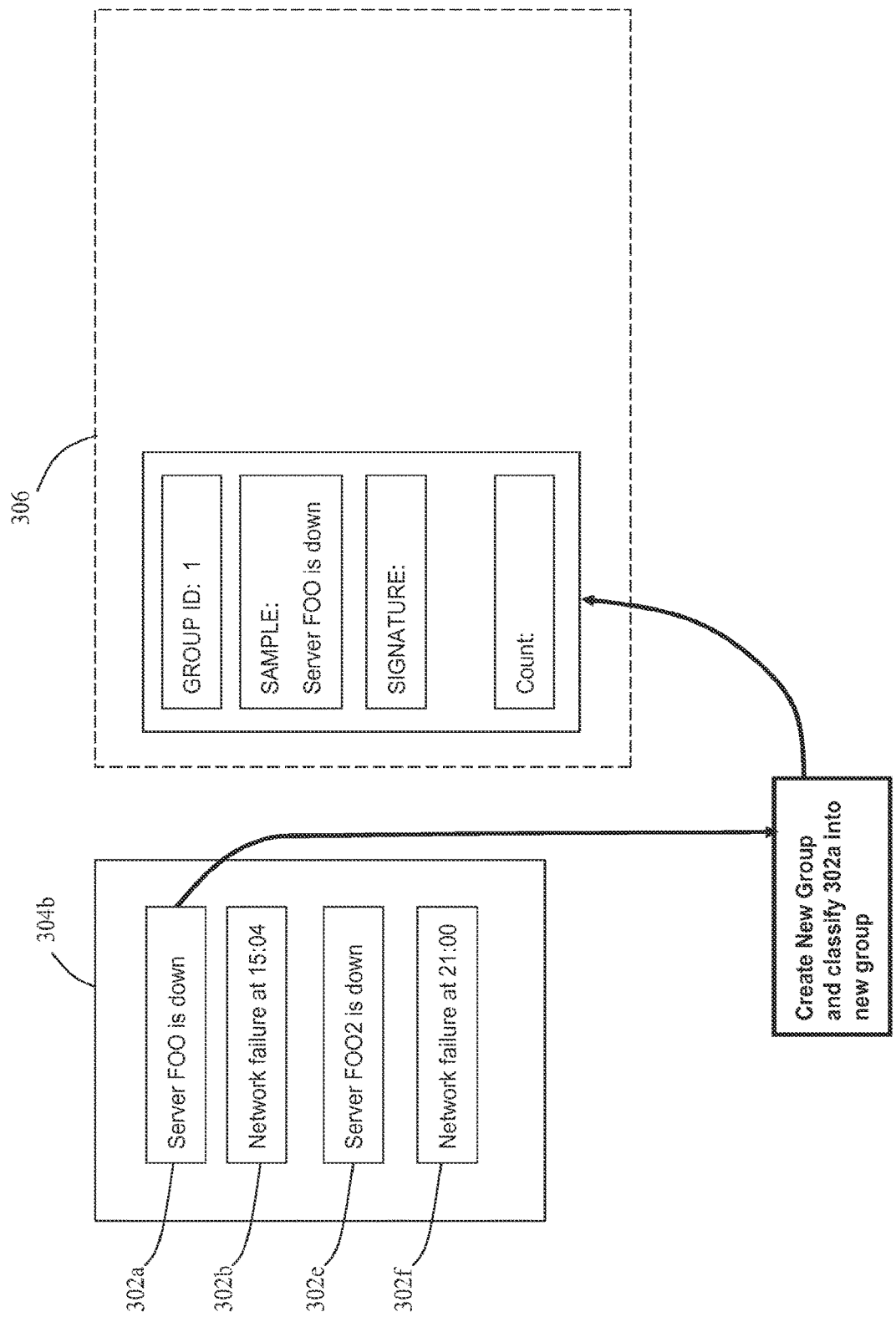
Figure 3D:
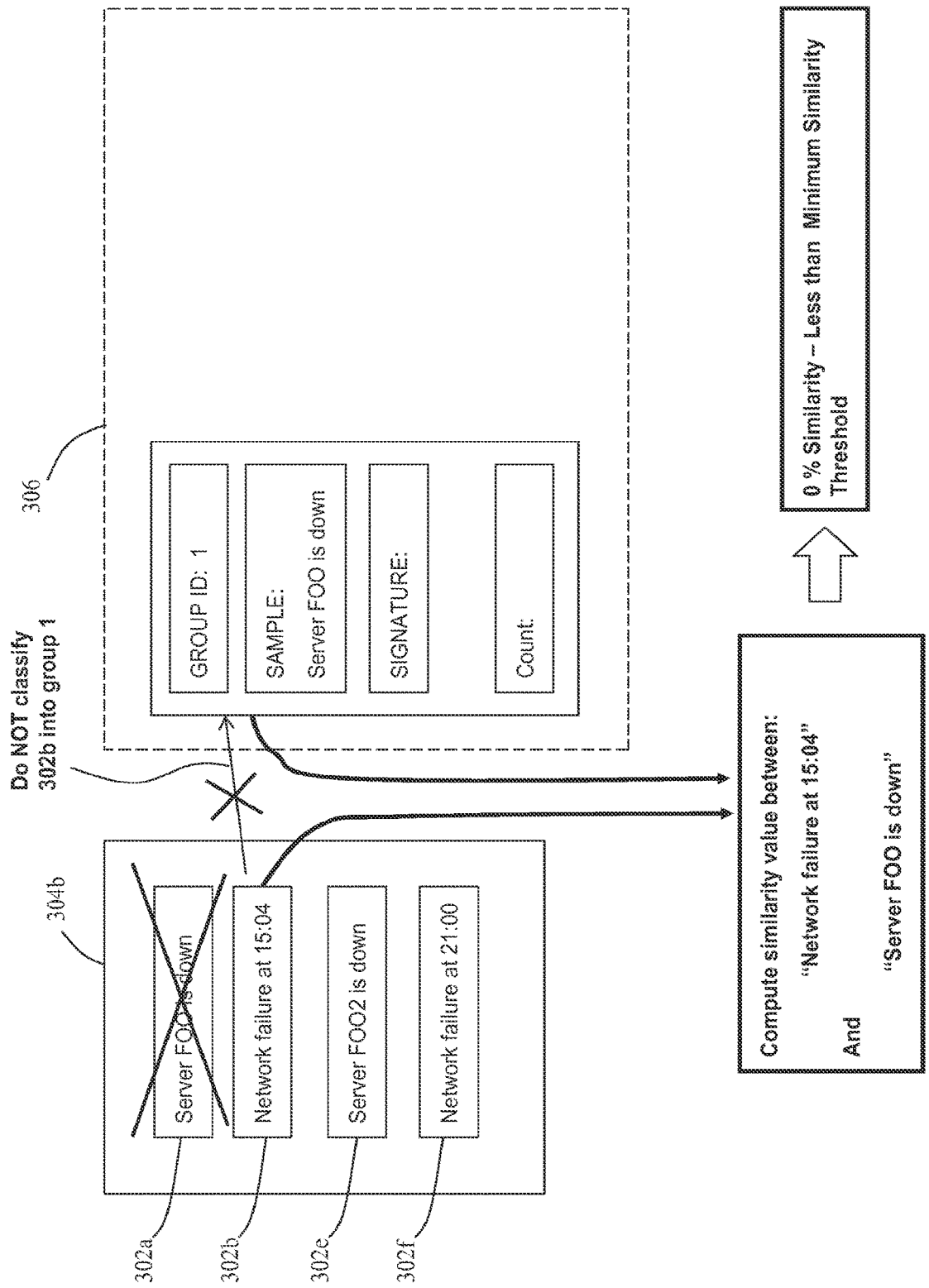
Figure 3E:
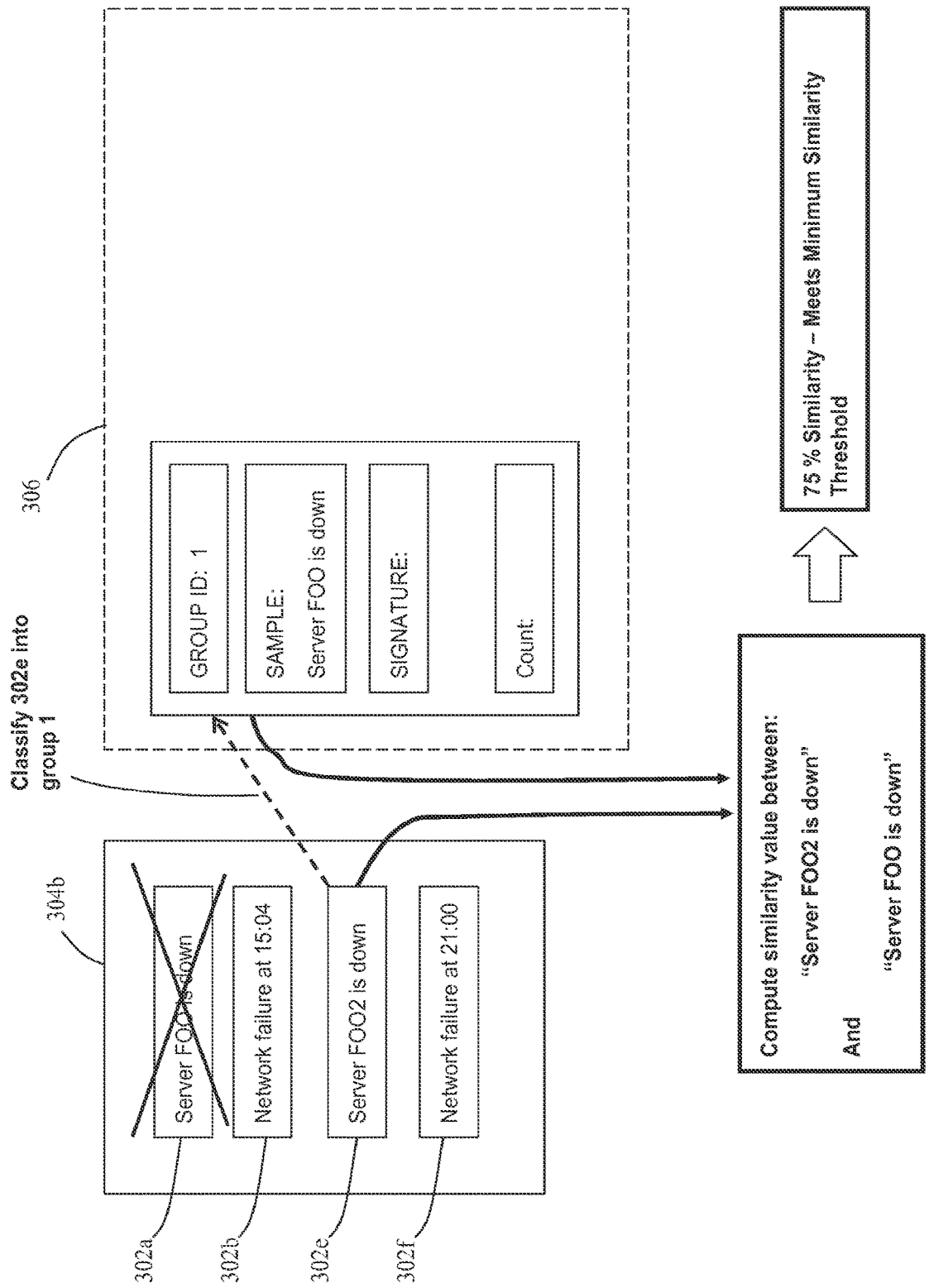
Figure 3F:
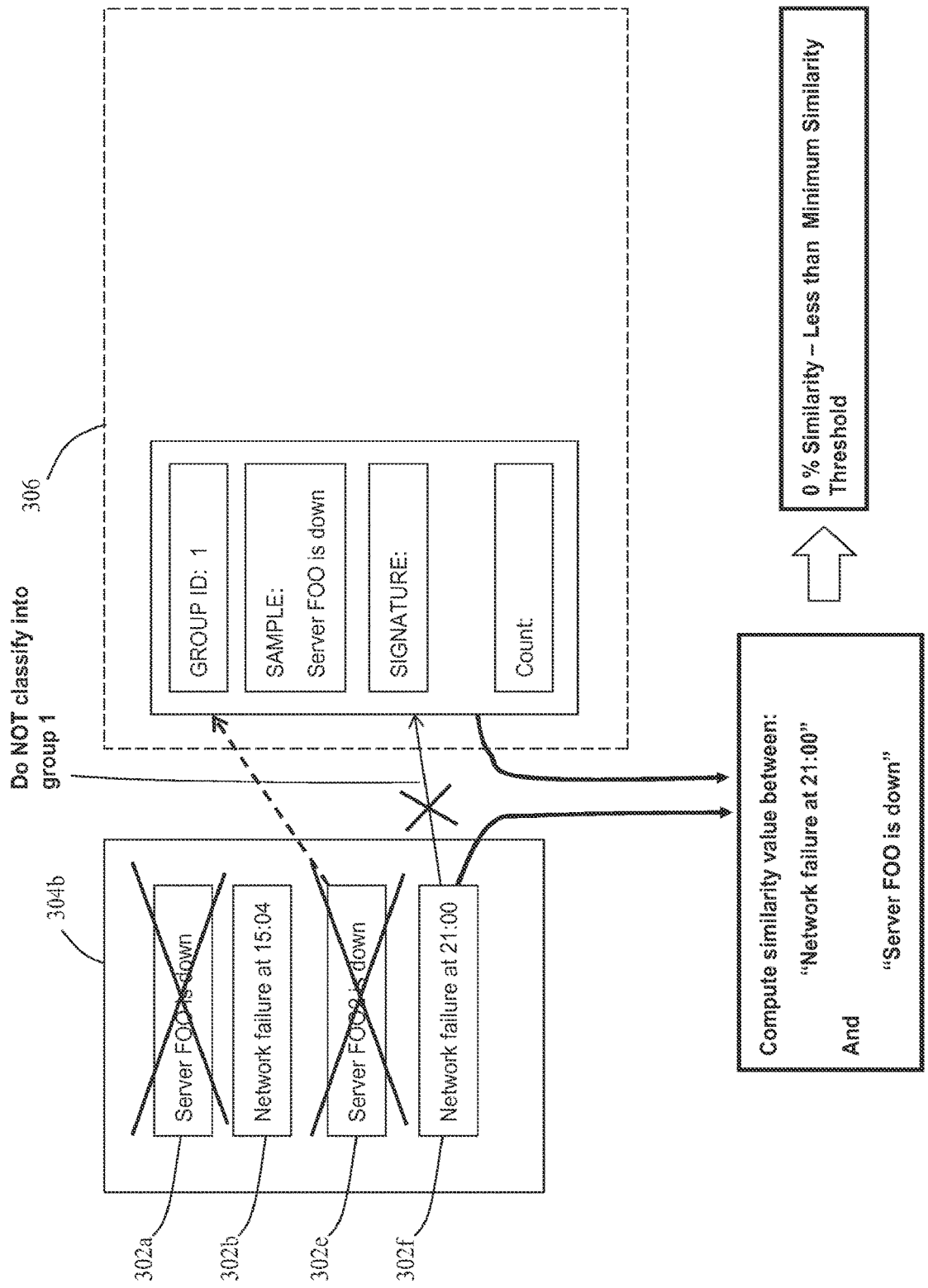
Figure 3G:
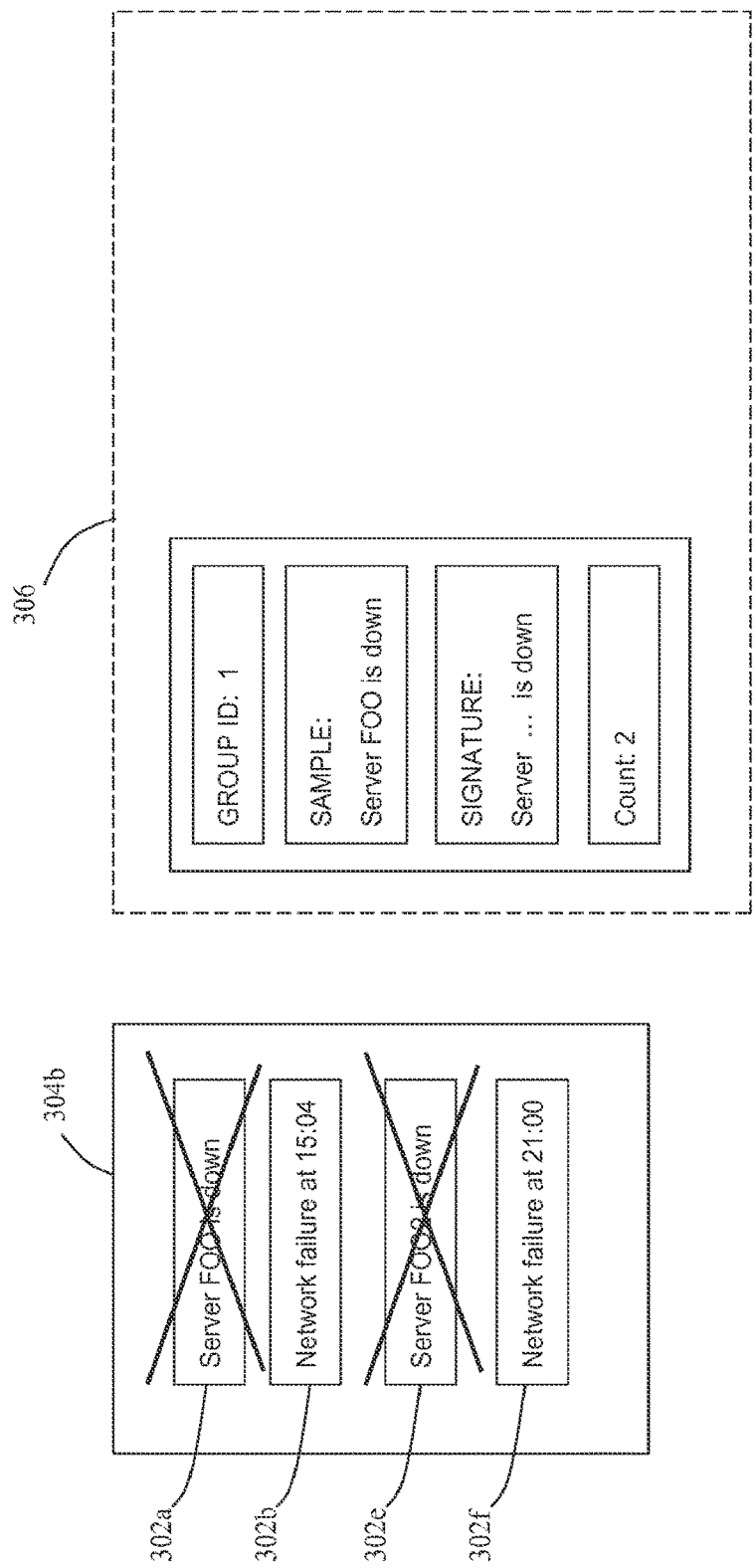
Figure 3H:
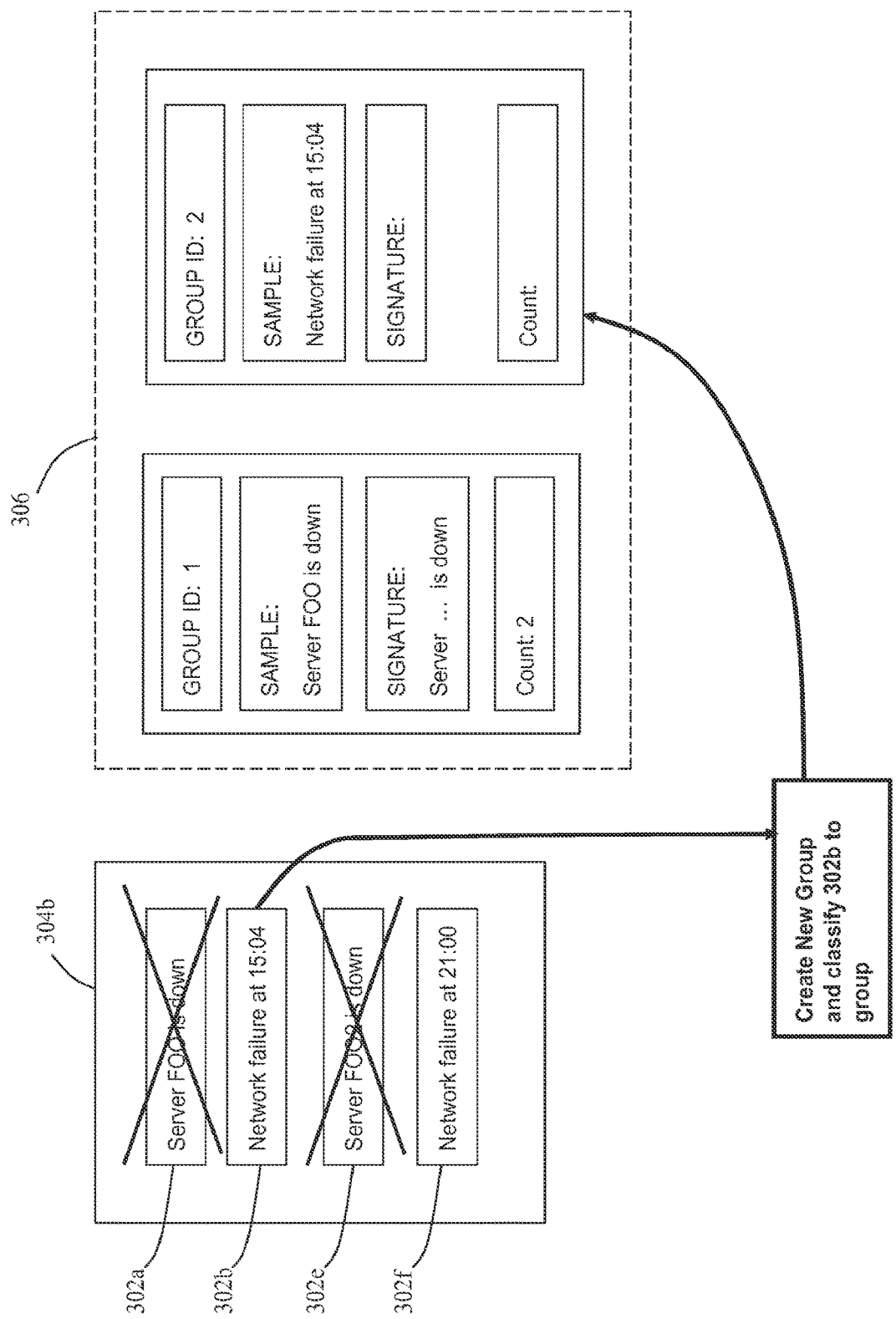
Figure 3I:
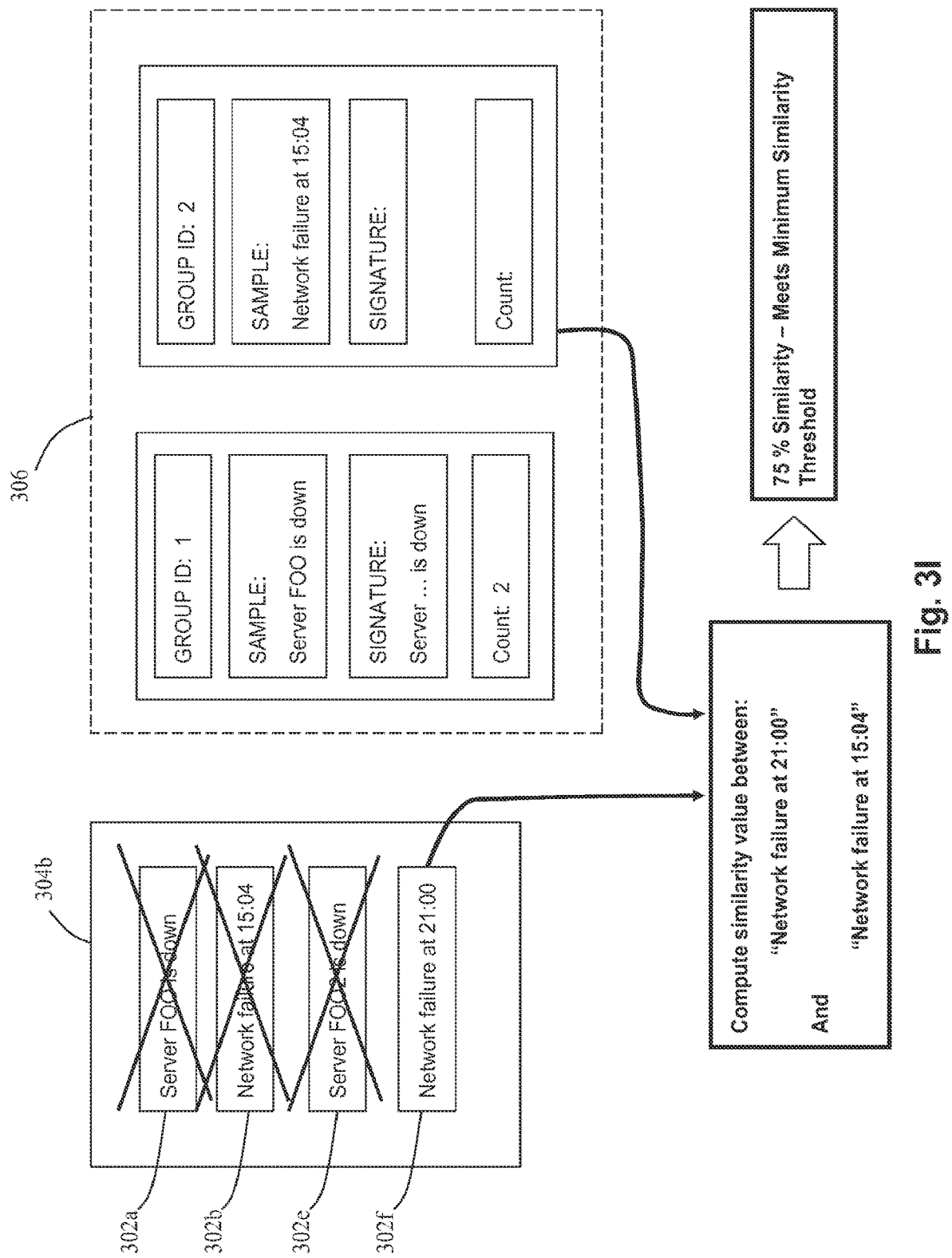
Figure 3J:
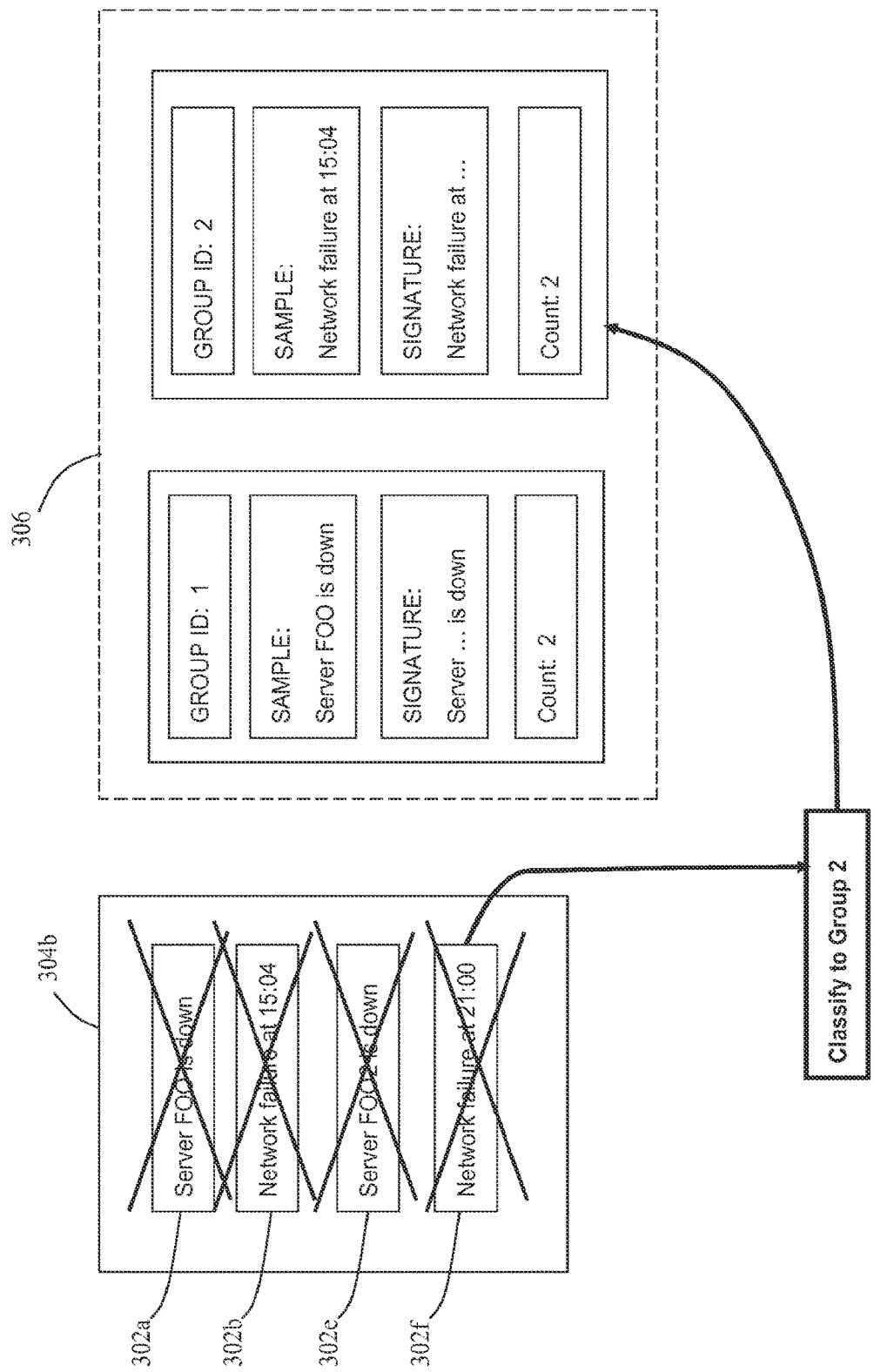
Figure 3K:
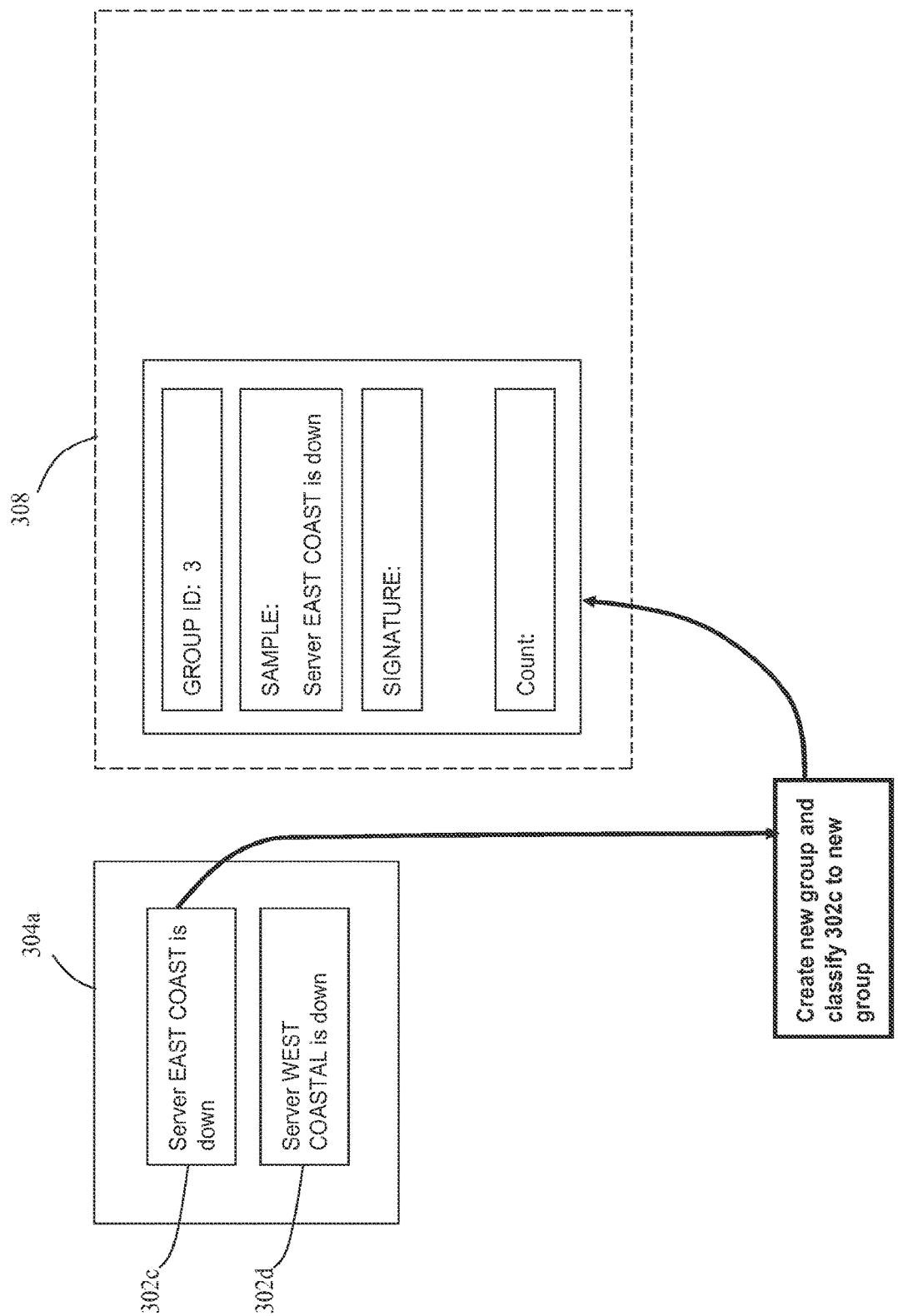
Figure 3L:
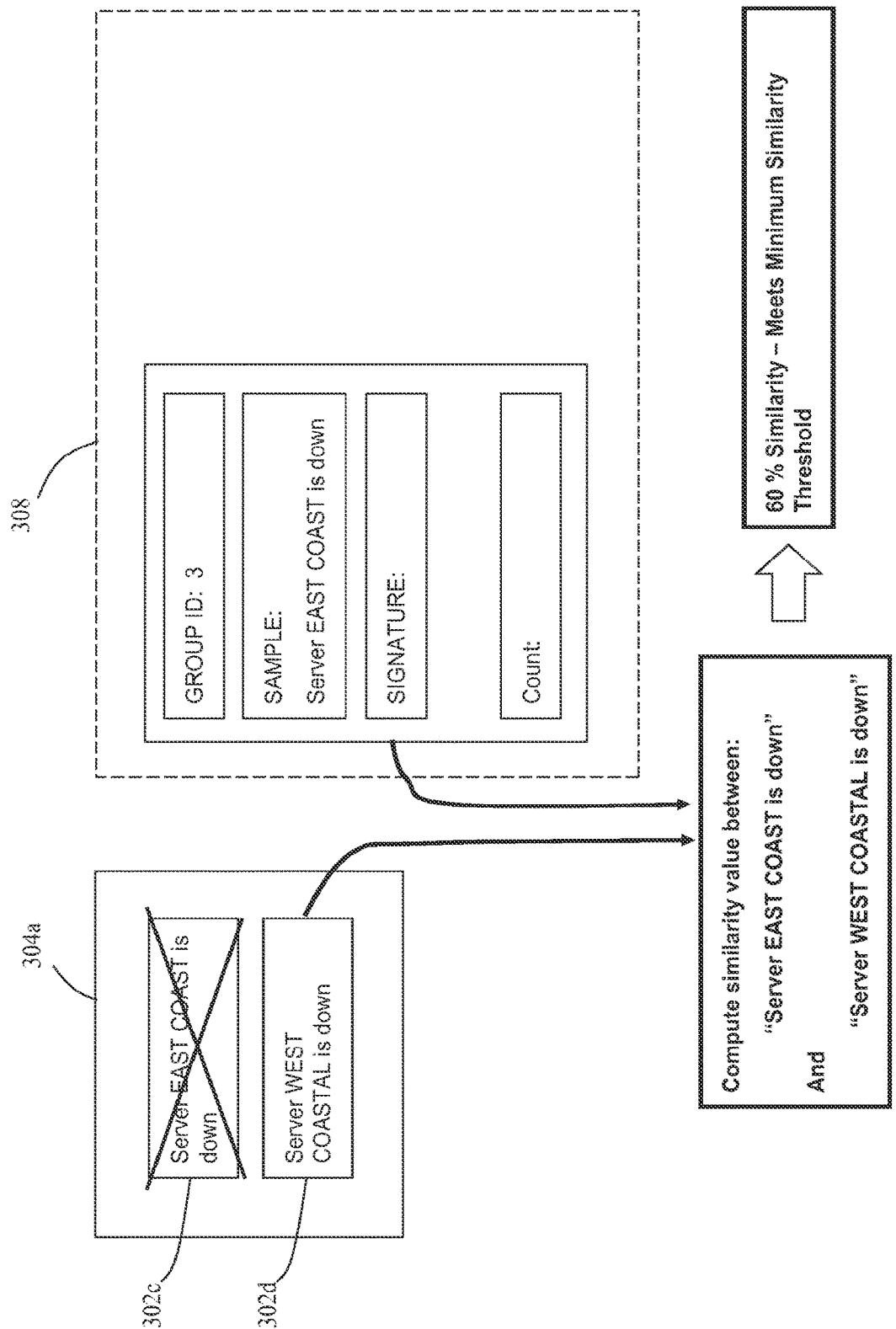
Figure 3M:
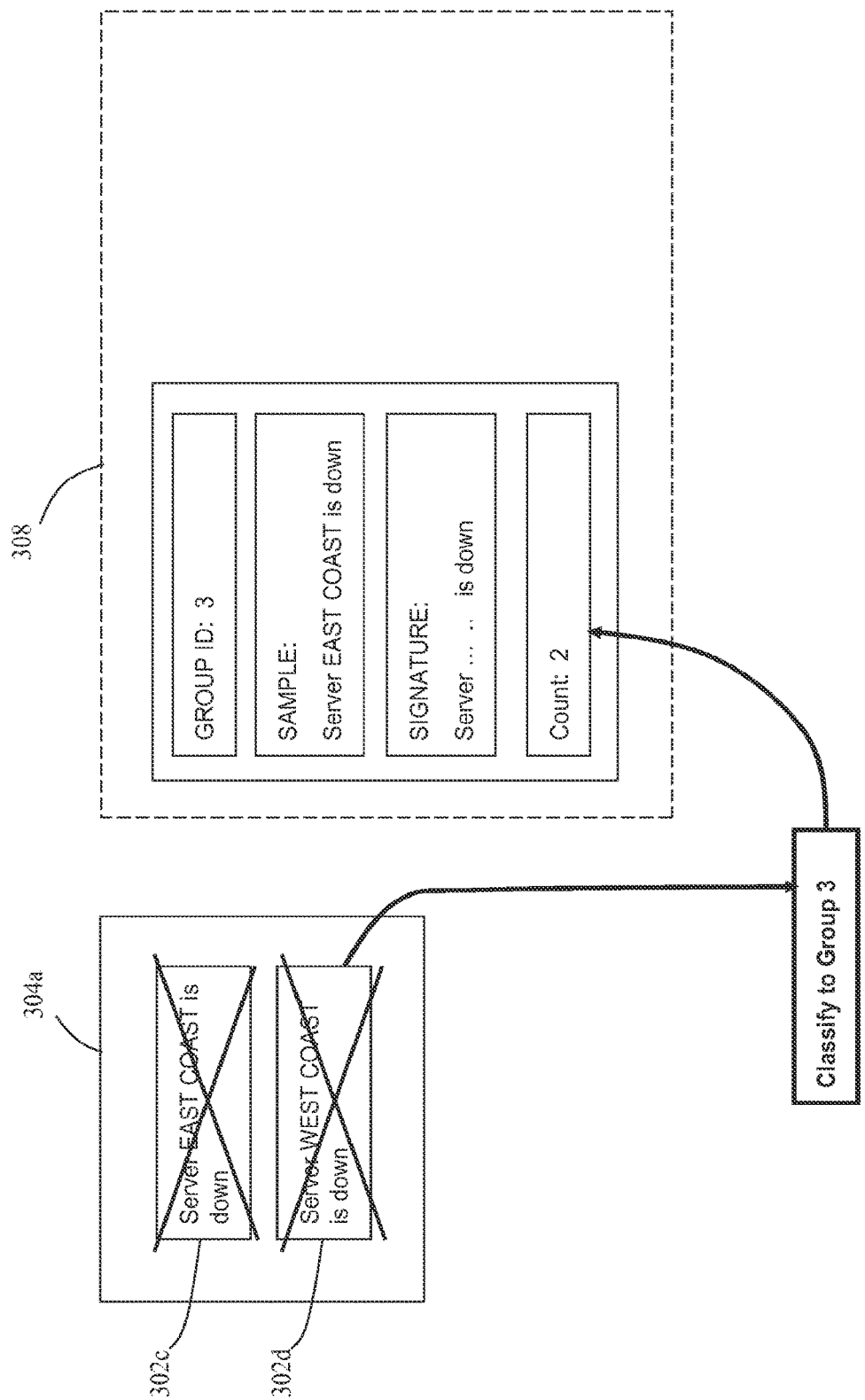
Figure 3N:
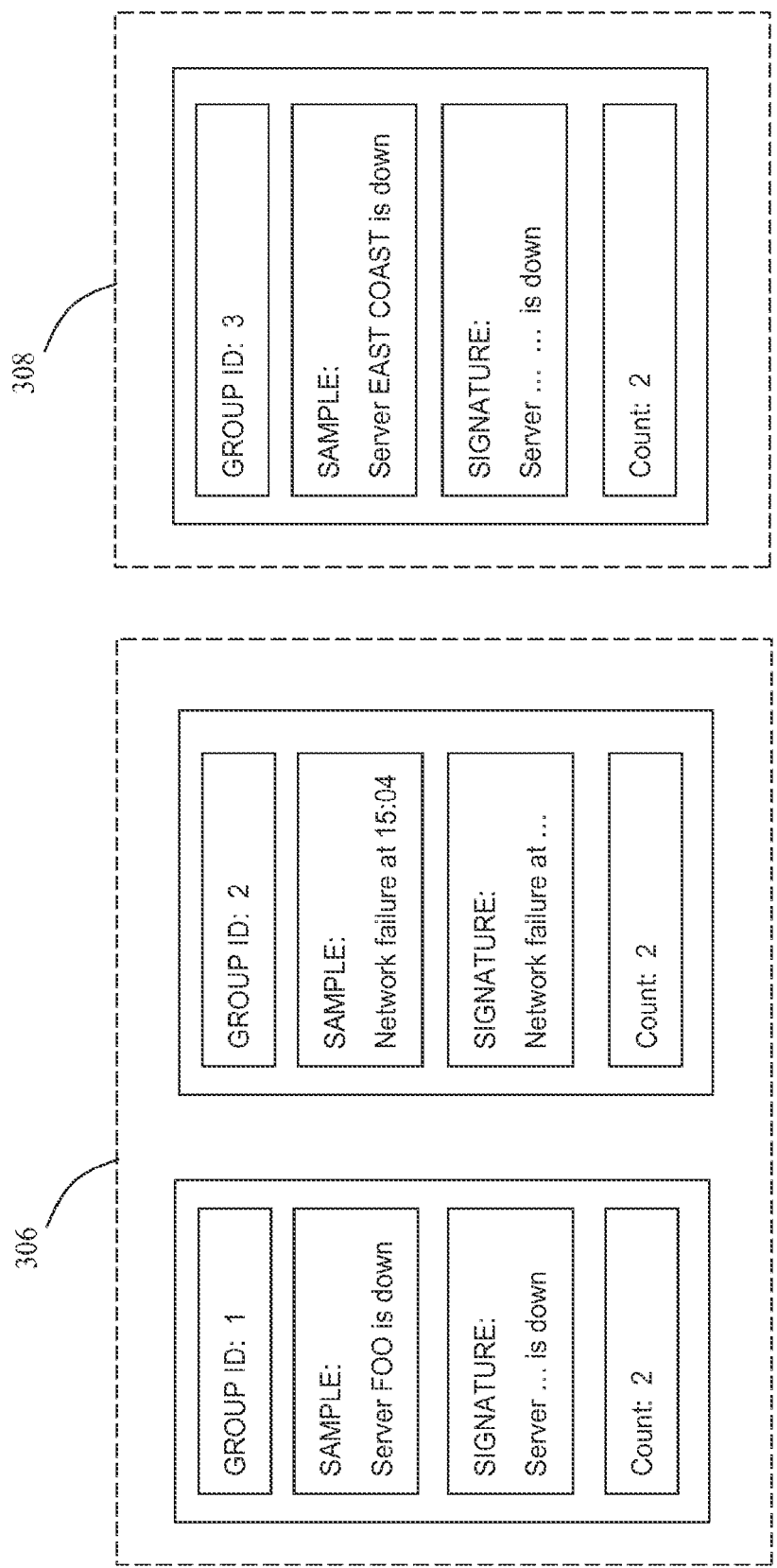

FIGS. 3A-N provide an illustrative example of the process to group the log data. FIG. 3A shows an example set 300 of raw log data. This set 300 of log data includes log records 302a-f.

As shown in FIG. 3B, data subsetting can be performed over the set 300 of log data. In particular, each log record 302a-f is tokenized to identify the number of tokens in the record. Here, each log record having five tokens can be placed into subset 304a. This subset includes log records 302c and 302d. Each log record having four tokens can be placed into subset 304b. This subset includes log records 302a, 302b, 302e, and 302f.

The process then proceeds by classifying the subset 304b having the 4-token records, including log records 302a, 302b, 302e, and 302f. As shown in FIG. 3C, a first log record 302a is selected to start a new group (Group ID 1). The content of the log record is set to be the sample for this new group.

At this point, each of the unclassified log records is reviewed to determine whether they should be classified to this Group 1. FIG. 3D shows the analysis for log record 302b. A hamming distance is generated for this log record 302*b* to see if it is sufficiently close in distance to the contents of the sample for Group 1. In this case when token-based hamming is performed, it can be seen that the two log records are dissimilar enough such that none of the tokens match in any position within the two records. Therefore, log record 302*b* will not be classified to Group 1.

FIG. 3E shows the analysis for log record 302*e*. A hamming distance is generated for this log record 302*e* to see if it is sufficiently close in distance to the contents of the sample for Group 1. Here, it can be seen that the two log records are very similar, with static portions for the records that are identical for the first token "Server", the third token "is" and the fourth token "down". Only the second token differs between the two records, with the sample record having "FOO" as the second token and the analyzed record 302*e* having "FOO2" as the second token. If the system uses a minimum similarity threshold of 60%, then since the similarly percentage is 75% (three of the four tokens match), log record 302*e* will be classified to Group 1.

FIG. 3F shows the analysis for log record 302*f*. A hamming distance is generated for this log record 302*f* to see if it is sufficiently close in distance to the contents of the sample for Group 1. In this case, it can be seen that the two log records are dissimilar enough such that none of the tokens match in any position within the two records. Therefore, log record 302*f* will not be classified to Group 1.

At this point, it has been concluded that records 302*a* and 302*e* should both be part of Group 1. FIG. 3G shows the content of the data object that represents Group 1 with the classification of both these records to this group. The sample for this group remains the contents of the first record 302*a* for this group. In addition, a signature has been established, which identifies the static portion of the tokens for the group, along with the variable portion represented with the symbol " . . . ". This creates a form of a regular expression that represents all the members of the group. In addition, a count is made of the number of records in the group (a count of 2 that represents records 302*a* and 302*e*). While not shown in the figure, the information maintained for the group will also include the identity of the members that belong to it. In this example, the members of group 1 are 302*a* and 302*e*.

There now remains at least one unclassified record still in the subset 304*b*. As shown in FIG. 3H, a log record 302*b* is selected to start a new group (Group ID 2). The content of the log record is set to be the sample for this new group.

At this point, each of the remaining unclassified log records is compared to determine whether they should be classified to this Group 2. FIG. 3I shows the analysis for log record 302*f*. A hamming distance is generated for this log record 302*f* to see if it is sufficiently close in distance to the contents of the sample for Group 2. Here, it can be seen that the two log records are very similar, with static portions for the records that are identical for the first token "Network", the second token "failure", and the third token "at". Only the fourth token differs between the two records, with the sample record having "15:04" as the fourth token and the analyzed record 302*f* having "21:00" as the fourth token. If the system uses a minimum similarity threshold of 60%, then since the similarly percentage is 75% (three of the four tokens match), log record 302*f* will be classified to Group 2.

By this point, it has been concluded that records 302*b* and 302*f* should both be part of Group 2. FIG. 3J shows the content of the data object that represents Group 2 with the classification of both these records to this group. The sample for this group remains the contents of the first record 302*b* for this group. In addition, a signature has been established, which identifies the static portion of the tokens for the group, along with the variable portion represented with the symbol " . . . ". This creates a kind of regular expression that represents all the members of the group. In addition, a count is made of the number of records in the group (a count of 2 that represents records 302*b* and 302*f*). The information maintained for the group will also include the list of members that belong to it. In this example, the members of group 2 are 302*b* and 302*f*.

Since all of the records in subset 304*b* have now been classified, another subset will be selected for processing. As shown in FIG. 3K, subset 304*a* will now be selected for processing. A log record 302*c* is selected to start a new group (Group ID 3). The content of the log record is set to be the sample for this new group.

Each of the remaining unclassified log records is now compared to determine whether they should be classified to this Group 3. FIG. 3L shows the analysis for log record 302*d*. A hamming distance is generated for this log record 302*d* to see if it is sufficiently close in distance to the contents of the sample for Group 3. Here, it can be seen that the two log records are very similar, with static portions for the records that are identical for the first token "Server", the fourth token "is", and the fifth token "down". Only the second and third tokens differ. If the system uses a minimum similarity threshold of 60%, then since the similarly percentage is at exactly 60% (three of the five tokens match), log record 302*d* will be classified to Group 3.

It has now been concluded that records 302*c* and 302*d* should both be part of Group 3. FIG. 3M shows the content of the data object that represents Group 3 with the classification of both these records to this group. The sample for this group remains the contents of the first record 302*c* for this group. In addition, a signature has been established, which identifies the static portion of the tokens for the group, along with the variable portion represented with the symbol " . . . ". This creates a kind of a regular expression that represents all the members of the group. In addition, a count is made of the number of records in the group (a count of 2 that represents records 302*c* and 302*d*). The information maintained for the group will also include the identity of the members that belong to it. In this example, the members of group 3 are 302*c* and 302*d*.

FIG. 3N shows the final groups that have been identified for the log records. As is evident, this approach provides an extremely efficient and fast operation, since it operates on simple and straightforward vectorized operations. In addition, this approach is parallelizable along many different types of partitioning boundaries, e.g., subset boundaries or classification operation boundaries.

Under normal circumstances, this approach can achieve considerable information reduction. Text messages can be transformed into group-IDs (stored as integers). The number of distinct messages is typically orders of magnitude smaller than the number of the discovered groups of messages. Also, transforming text to numeric values allows developing further algorithms for anomaly detection, sequence analysis, forecasting etc. Such algorithms operate faster on numeric rather than textual data.

The embodiments of the invention may be applied to handle for online and offline processing. With offline processing, a corpus of messages are collected together and are then processed on a batch basis as an entire group of records. For example, the above-described processing may be applied to handle offline processing for a collected corpus of records.

Figure 2D:
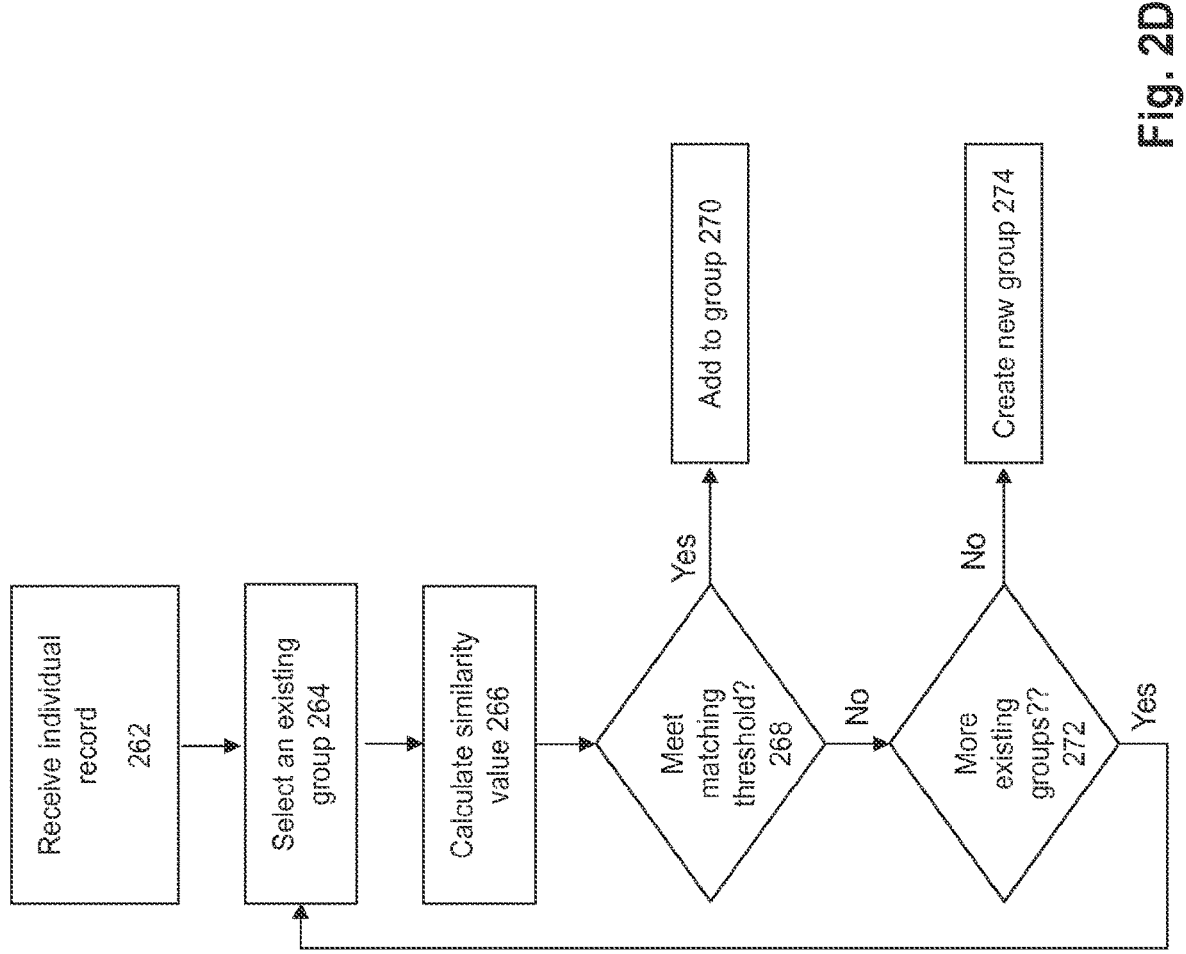
FIG. 2D shows a flowchart of an approach to perform online processing of log records.

FIG. 2D shows a flowchart of an approach that can be taken to implement online processing of messages. This situation may occur, for example, when an analytics system is implemented to handle an incoming stream of messages, and therefore each record/message is handled on an ongoing basis individually. The process begins at 262 with the receipt of an individual record to be processed. As previously noted, the log data may originate from any log-producing source location, such as a database management system, database application, middleware, hardware logs, operating system logs, application logs, application server logs, database server logs, and any other type of log that monitors the behavior of a system or application.

For this type of online processing, one or more groups may have already been setup for previously processed messages, where processing is performed to check if the new message belongs to a previously established group. Therefore, at 264, one of the existing groups is initially selected for this type of checking. At 266, a similarly value is calculated between the new message and the sample message for an existing group. As previously noted, any suitable similarity value may be used employed. In some embodiments, the hamming distance is calculated between the new message and the sample message for the group.

A determination is made at 268 whether the similarity value meets a specified matching threshold. If so, then at 270, the new message is categorized into the existing group. If not, then another determination is made at 272 as to whether there are any further exiting groups to process. If so, then the process loops back to 264 to select the existing group and to repeat the above steps.

If a match to an existing group is not found and there are no further groups to process, then at 274, a new group is created for the new message. The new group would include the new message as the message sample.

The potential problem with the inline processing approach is that this type of one-by-one processing of messages could consume an excessive amount of ongoing system resources. On the other hand, offline processing may incur too much delay between the generation of a message and the point at which analysis may be performed upon the classified messages.

Therefore, a hybrid approach can be taken that operates with aspects of both the online and offline approaches. With the hybrid approach, individual messages are not processed on a one-by-one basis; nor are the entirety of the messages gathered together into an extremely large group for batch processing. Instead, the incoming messages can be collected until a threshold number of messages (e.g., approximately one hundred messages) are gathered together and then processed as a group. In this way, the system more efficiently processes the messages since they are handled as a group rather than one-by-one, while still reducing delays given the relatively small size of the group of messages to be processed.

In an alternative embodiment, rather than collecting a threshold number of messages, a threshold time period can be established for collecting together the messages to be processed as a group.

Regardless of whether online, offline, or hybrid processing is performed, data post-processing may additionally be performed on the grouped data to further enhance the grouping results. To explain why this may be desirable, consider the groups shown in FIG. 3N. It can be seen that the sample log message for Group 1 ("Server FOO is down") is very similar to the sample log message for Group 3 ("Server EAST COAST is down"). In this case, the only difference between these two groups is that the messages for Group 3 include a 2-token server name, while the messages for Group 1 include 1-token server names. As such, it would be rational to include the messages for both groups into the same overall group. However, an algorithm that performs data subsetting based upon the number of tokens in the message would place these message into different subsets, and hence into different groups—resulting in the groups shown in FIG. 3N.

FIG. 4 shows the flowchart of one possible approach that can be taken to perform data post-processing to address this situation. At 402, the process begins by receiving signatures for the different groups. The signatures include static token portions as well as a zero or more variable token portions.

Next, at 404, the variable token portions are collapsed. One possible approach to collapse the variable token portion is to identify all adjacent variable portions, and to then collapse the adjacent variable portions into a single variable portion.

Thereafter, the collapsed signatures are compared with one another at 406. If any collapsed signatures match, then at 408, the messages for the matched signatures can be merged together into a single group.

Figure 5B:
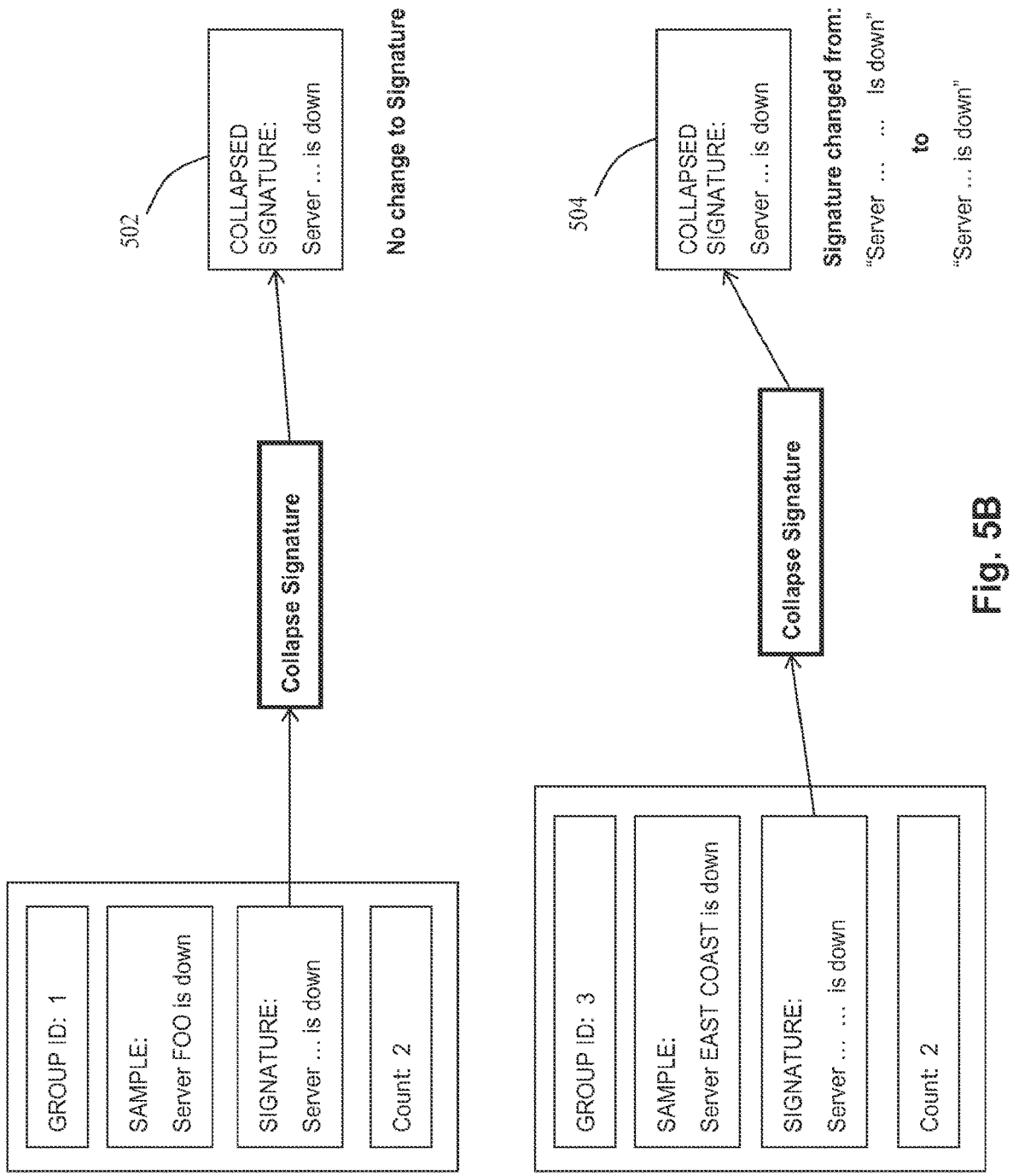
Figure 5C:
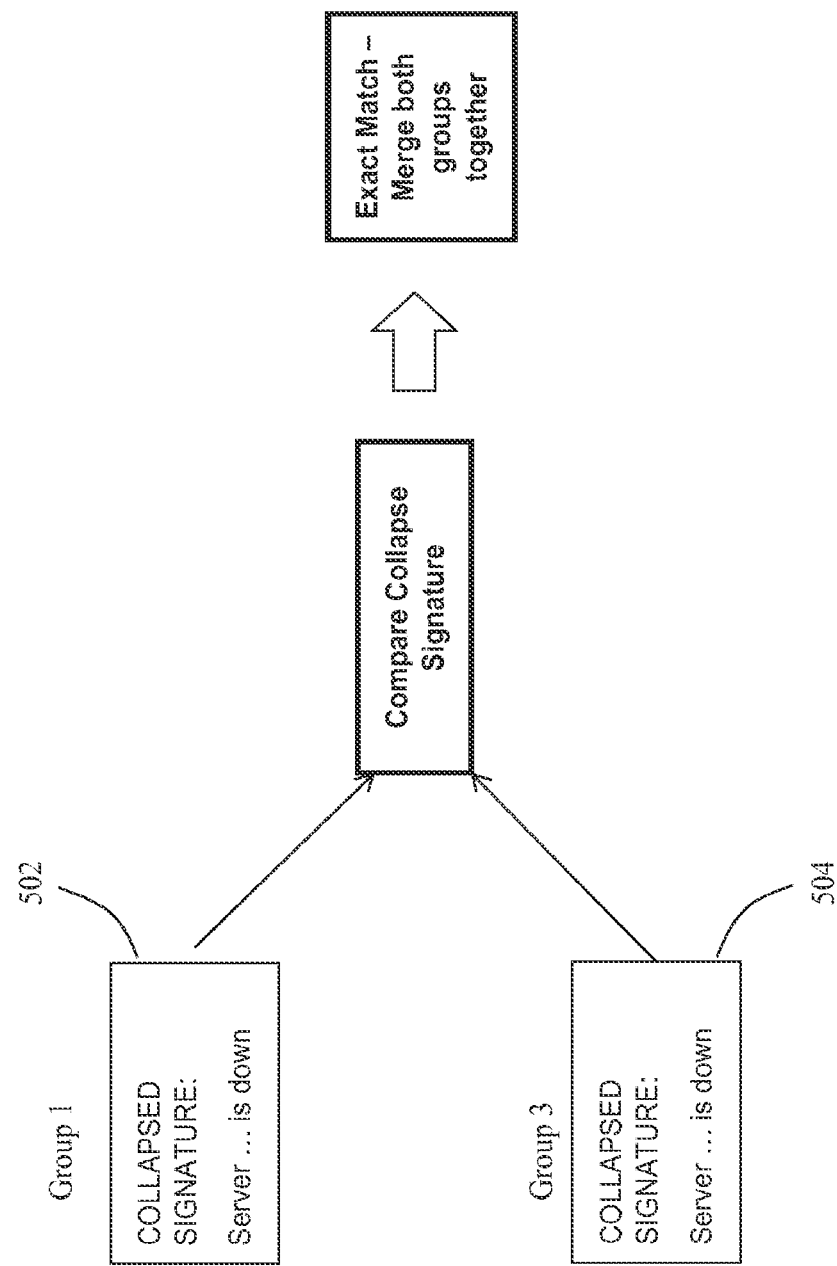

FIGS. 5A-C illustrate this process. FIG. 5A reproduces Groups 1 and 3 that had previously been identified. Here, Group 1 corresponds to the signature "Server . . . is down" and Group 3 corresponds to the signature "Server . . . is down".

As shown in FIG. 5B, the next action is to collapse each of these signatures. As previously noted, Group 1 corresponds to the signature "Server . . . is down", which includes the first token "Server" being a static token, the third token "is" being a static token, and the fourth token "down" being a static token. The symbol " . . . " represents a single variable token in the second token position. Since there is only a single variable token, there is really nothing to collapse in this signature. As a result, the collapsed version 502 of the signature is the exact same as the original version of the signature.

Group 3 corresponds to the signature "Server . . . is down", which includes the first token "Server" being a static token, the fourth token "is" being a static token, and the fifth token "down" being a static token. However, the symbol " . . . " that represents a variable token appears twice in this signature, in both the second token position and the third token position.

In this case, the signature for Group 3 can indeed be collapsed, since there are multiple variable parts in adjacent token positions. This signature can therefore be collapsed by combining the two variable token parts into a single variable token part. This approach converts the original signature:

"Server . . . is down"

into the collapsed signature 504:

"Server . . . is down"

As shown in FIG. 5C, a comparison can now be performed between the collapsed signature 502 for Group 1 and the collapsed signature 504 for Group 3. Here, because the collapsed signatures for these two groups exactly match, the messages associated with these matched signatures can then be merged together into a single group.

The above operations to group log data could be performed on different batches of log records. For example, the different batches of groups may have been generated at different points in time. It would be of interest to be able to compare the groups from the different batches to determine any changes in group content that may change between the different batches.

As just one example, assume that an administrator seeks to track the occurrence of a certain type of error message over time. In this case, this can be accomplished by identifying the group for each time period that is associated with the error message, and then checking the count of that group for each time period.

The issue is that since the grouping process occurs in different time periods, while the messages themselves may have been appropriately grouped together, the specific group number assigned to the group may change between the different time periods. This is especially true if the group numbers are assigned to the groups in a non-deterministic fashion. Therefore, it may be a non-trivial exercise to determine whether a group established in a first time period matches another group established in a second time period.

It is noted that this problem may occur for any basis on which the grouping is executed on different batches of log messages. These batches could be generated based on some temporal constraint, on target-ids (e.g., based on specific server names), or any other filter that is usable.

Figure 6A:
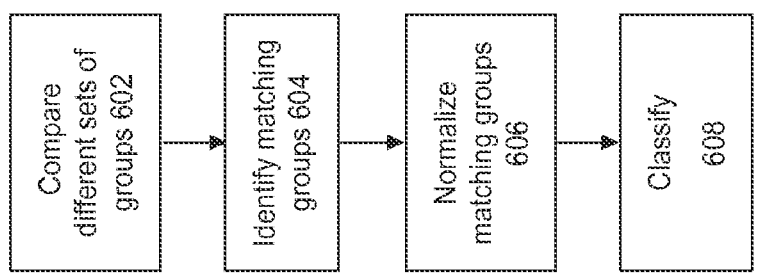
FIG. 6A shows a flowchart of an approach that can be taken to homogenize the different groupings that are generated for the different batches.

FIG. 6A shows a flowchart of an approach that can be taken to homogenize the different sets of groups that are generated for the different batches, and to compare how the counts change from one batch to the next.

At 602, a comparison is performed for the different sets of groups in the different batches. At 604, the matching groups are then identified between the different batches. These actions may be performed, for example, by using the sample text for each group. With the samples, the previously described process of computing similarity values/hamming distances can then be used to check for threshold levels of similarities/differences between each of the samples for the groups in the different batches. Any of the groups that meet the minimum threshold similarity threshold would be classified as belonging to the same group. In effect, to make the groups for the different batches homogenous, this operation calls the above-described classify functionality and passes all the group samples as input messages. Samples that are grouped together correspond to groups from different batches that should be merged into a new global group. The counts of the new global group are simply the sum of the individual counts in the original groups that have been merged.

At 606, normalization can then occur for the groups in the different batches to record their association with common groups between batches. One way to preserve this normalization is to tag each of the records with a common identifier for records that belong to the same group. In addition, a common sample can be assigned to all groups that should be associated with one another.

Thereafter at 608, an overall process classification (hereinafter referred to as classify delta) is performed and generated for the user. For example, the batches can be ordered based on time or other factors. The comparison of the global counts can be used as a form of anomaly detection, since it can indicate changes in the behavior of the system.

This approach is also useful to parallelize processing of records when the corpus of messages is extremely large. In this situation, the large group of messages can be broken up into much smaller subsets of records for processing. Each subset can then be processed in parallel before merging the results together into the final set of groups.

Figure 6B:
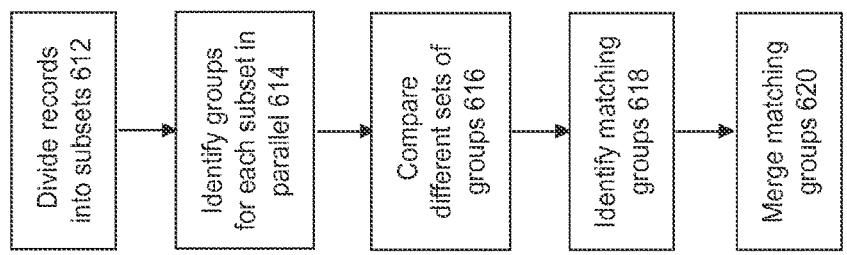
FIG. 6B shows a flowchart of an approach that can be taken to parallelize processing of log records.

FIG. 6B shows a flowchart of an approach to perform this type of parallelization. At 612, the set of records are divided into multiple subsets of records. At 614, each of the subsets is separately processed by different processing entities to group the records. Such processing entities may include, for example, parallel processes, threads, tasks, nodes, processors, and/or any other type of entity that is capable of performing work.

The groups identified for the different subsets can then be brought together. At 616, a comparison is performed for the different sets of groups in the different subsets. This may be performed, for example, by computing a similarity value for the sample text for each group within the subsets. The previously described process of computing similarity values/hamming distances can be used to check for threshold levels of similarities/differences between each of the samples for the groups in the different subsets.

At 618, the matching groups are then identified between the different subsets. Any of the groups that meet the minimum threshold similarity threshold would be classified as belonging to the same overall group.

At 620, each of the groups within the subsets that match within the threshold similarity level would be merged together into a global group. The counts of the new global group are simply the sum of the individual counts in the original groups that have been merged.

The present embodiment also provides an improved approach to visualize the processing results. Deciding which groups of messages to focus on and how to visualize the result can be challenging. In some embodiment, improved visualization can be accomplished by sorting the groups by maximum value of absolute difference between consecutive batches and by showing the top-n results. Any suitable approach can then be used to display the results, e.g., by visualizing the result using a slopegraph or heatmap.

The previous operations that have been discussed thus far provide information about individual groups of messages. Embodiments of the invention can also be extended to identify frequent sequences of (grouped) messages (referred to herein as "findSubsequences"). An example function prototype that can be used to implement this operation is as follows:

findSubsequences (sequence, elements, before, after, top, min.freq)

The "sequence" argument is an input vector that represents a sequence of group-ids returned by the above-described classify operation. The "elements" argument represents an input vector of group-ids that are of interest. The "before" and "after" arguments denote the number of group-ids before and after, respectively, relative to the given elements that are to be analyzed in order to discover frequent subsequences. The "top" argument defines the number of the most frequent subsequences that are to be shown in the results. The "min.freq" argument sets a filter for the minimum frequency that these subsequences must have.

Figure 7A:
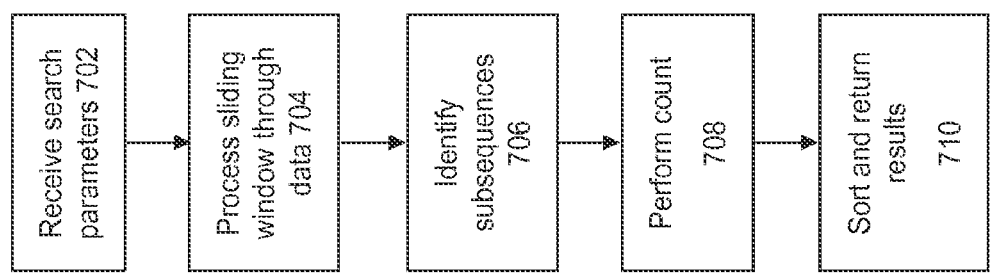
FIG. 7A shows a flowchart of an approach that can be taken to identify frequent sequences of (grouped) messages.

FIG. 7A shows a flowchart of an approach that can be taken to implement this operation. At 702, parameters are received or defined for the operation, e.g., using the arguments defined above.

Next, at 704, a sliding window is processed through the data. The sliding window is of size n, which equals a window of size before+after+1. The sliding window is processed by finding all the positions of the given elements in the original sequence, and iteratively aligning the sliding window on top of these positions (706).

For every subsequence of length n that is found while sliding the window, a hash code is generated. Then, a count is made of the number of appearances of every hash code (708). Finally, the hash codes are sorted by frequency, where the top hash codes are selected, based on the "top" input argument. A filtering action may be applied to filter out the ones that do not qualify under the minimum frequency criteria. At this point, the actual subsequences that correspond to the hash codes can be retrieved and returned with the results (710).

The following is an example of this operation:
>findSubsequences(some.sequence, elements=(1, 68), before=2, after=3, top=5, min.freq=2)

This example seeks all subsequences centered on the "1" or "68" identifiers, with two before and three after these identifiers. The request is for the top five by frequency to be returned, with a minimum frequency of two.

Figure 7B:
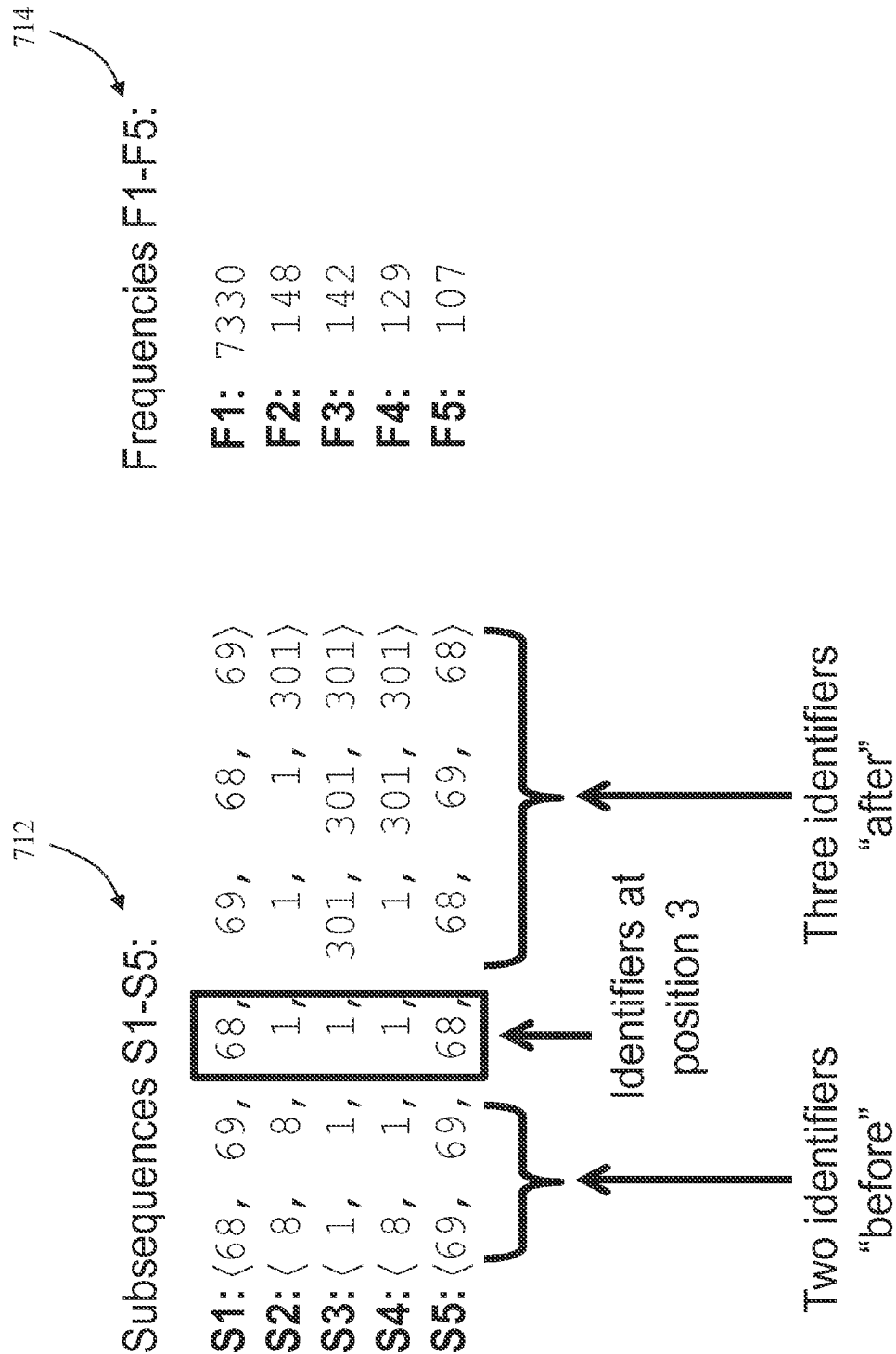
FIG. 7B illustrates example sequences of messages.

FIG. 7B illustrates a possible example of results in a user interface that may be returned for this example operation, where portion 712 shows various subsequences S1, S2, S3, S4, and S5 (e.g., the top five subsequences by frequency) that match the desired pattern and meet the minimum frequency criteria. For example, sequence S1 has "68" at position 3 with two identifiers before that position (i.e., "68" and "69") as well as three identifiers afterwards (i.e., "69", "68", and "69"). Similarly, sequence S2 has "1" at position 3 with two identifiers before that position (i.e., "8" and "8") as well as three identifiers afterwards (i.e., "1", "1", and "301"). Each of the other identified sequences similarly have "1" or "68" at position 3 with two identifiers before that position and three afterwards. Portion 714 can be used to identify the frequency of the respective subsequences, e.g., how many times each subsequence appears in the analyzed data.

Identifying frequent subsequences within a larger sequence permits a focus on certain log messages (the specified elements) and to find out the context for these messages. One can then further investigate correlations among the different log messages and to explore trends and patterns in those messages/sequences.

Figure 8:
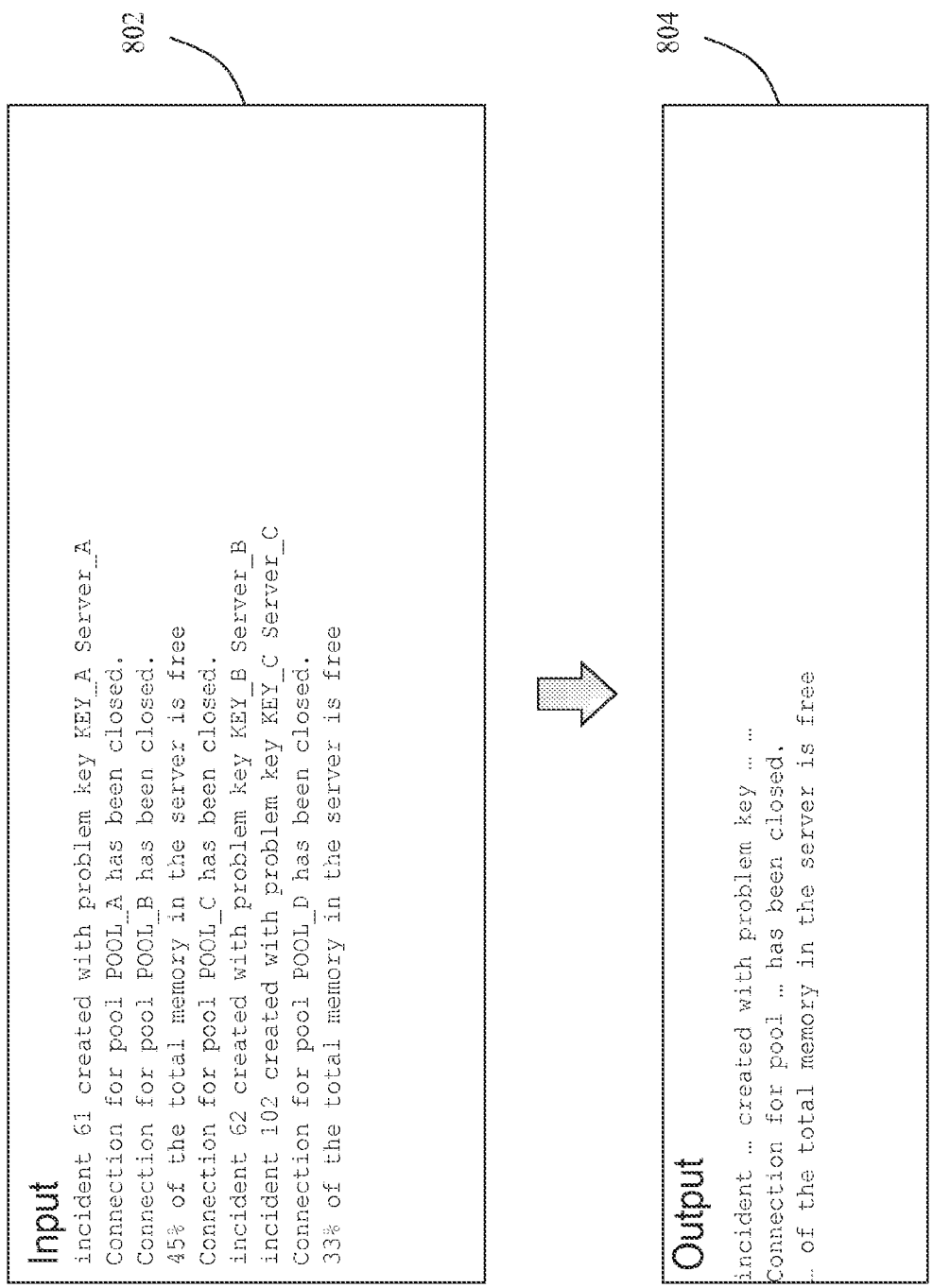
FIG. 8 illustrates the scenario where the input comprises a large set of log data, which can be significantly reduced in the output.

There are numerous possible applications of embodiments of the invention, which provide many benefits and advantages. One possible application is to reduce that amount of machine data and log data. FIG. 8 illustrates the scenario where the input 802 comprises a large set of log data, which can be significantly reduced in the output 804 using embodiments of the invention. This permits significant log reductions and possible unsupervised deduplication processing.

Figure 9A:
FIG. 9A illustrates the scenario where the input comprises a large set of URL data, which can be significantly reduced in the output.

Another use scenario if to perform categorization of URLs. FIG. 9A illustrates the scenario where the input 922 comprises a large set of URL data, which can be significantly reduced in the output 924 using embodiments of the invention to group similar URLs together. This approach is useful, for example, to perform automatic web log analysis.

Figure 9B:
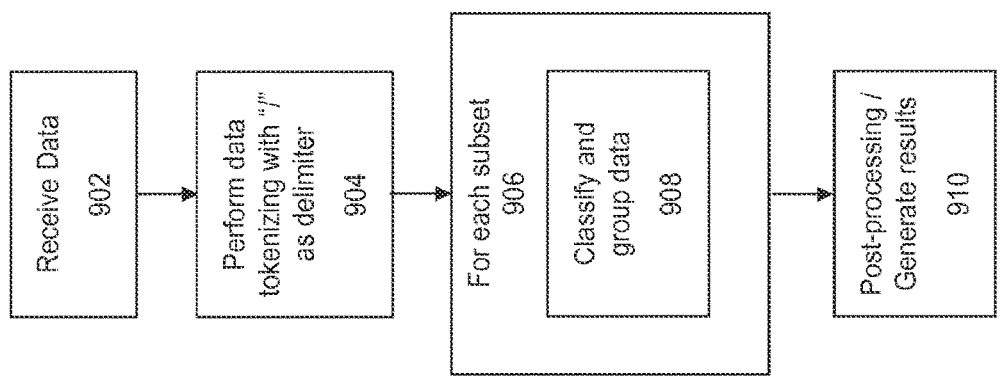
FIG. 9B shows a flowchart of an approach to classify URL data.

FIG. 9B shows a flowchart of an approach to implement this type of processing. At 902, the data records to be processed are received. These data records include entries having URL data, such as shown in input 922 of FIG. 9A.

At 904, tokenizing is performed with the "/" character as the tokenizer delimiter. This is in contrast to the approach of using a blank space as the delimiter (as described for earlier examples). By using the "/" character as the delimiter, this breaks up a typical URL address into its constituent portions, allowing a check of the variable parts for the different URL data inputs. This action breaks up the URL data into multiple subsets for processing using the "/" symbol.

Each data subset is thereafter processed at 906. At 908, classification is performed to group the log data into groupings for the log data having sufficient similarities. Thereafter, at 910, post-processing and generation of results are provided to the system user.

Figure 10A:
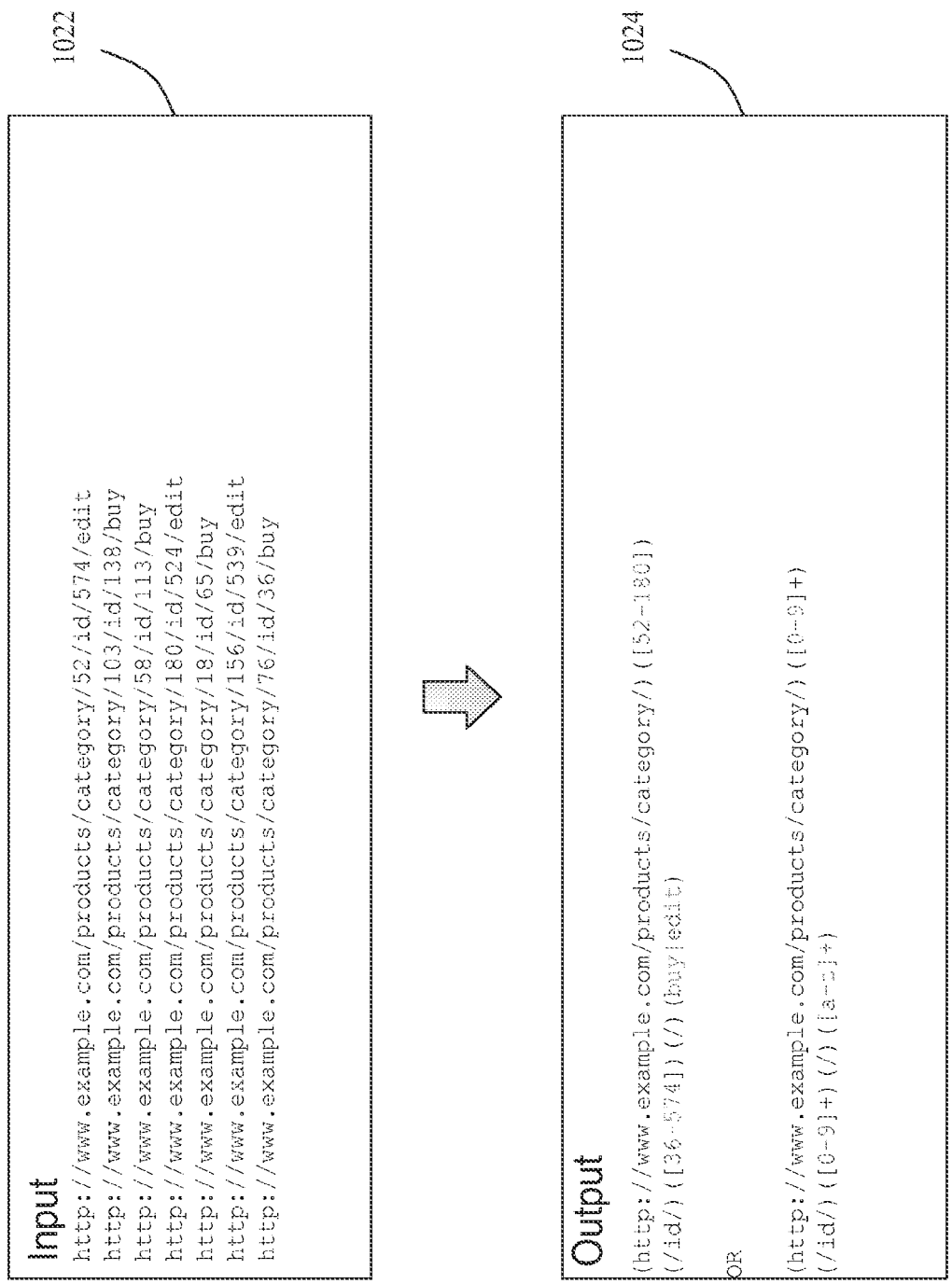
FIG. 10A illustrates the scenario where the input comprises a large set of URL data, where the output comprises auto-generated regular expressions that correspond to the input.

Yet another possible application is to bootstrap regular expression generation. FIG. 10A illustrates the scenario where the input 1022 comprises a large set of URL data, and where the output 1024 comprises auto-generated regular expressions that correspond to the input. This approach is useful, for example, to allow one to learn from the corpus of the text samples.

FIG. 10B shows a flowchart of an approach to perform this type of processing. At 1002, the data records to be processed are received. These data records include entries having URL data, such as shown in input 1022 of FIG. 10A.

At 1004, data subsetting is performed. As before, tokenizing is performed with the "/" character as the tokenizer delimiter. By using the "/" character as the delimiter, this breaks up a typical URL address into its constituent portions, allowing a check of the variable parts for the different URL data inputs.

Each data subset is thereafter processed at 1006. At 1008, classification is performed to group the log data into groupings for the log data having sufficient similarities.

Unlike the previously described approaches, here the different values of the variable parts within the groups are tracked at 1010. By tracking all of the different values for the variable parts in a given group, this identifies the range of possible values for that variable part. This range of values can then be translated into a regular expression that corresponds to that range of values within the group signature.

At 1012, a grammar can then be created for the classification. The grammar for the classification allows, for example, any additional sample outputs to be generated for a given classification group (e.g., for testing purposes). Thereafter, at 1014, post-processing and generation of results are provided to the system user.

Another use case is to match stack traces. FIG. 11A illustrates the scenario, where the input 1122 comprises traces, and the output 1124 identifies Java exceptions that are similar but not necessarily the same.

Figure 11B:
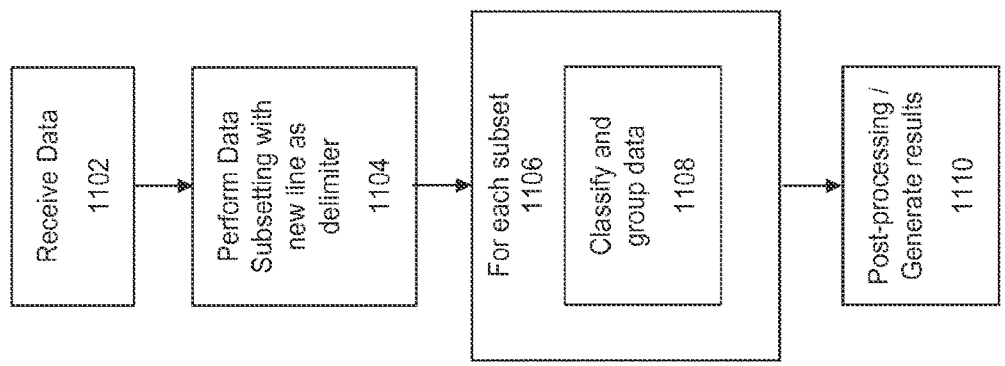
FIG. 11B a flowchart of an approach to generate the scenario shown in FIG. 11A.

FIG. 11B shows a flowchart of an approach to implement this type of processing. At 1102, the data records to be processed are received. These data records include entries having multi-line message data, such as shown in input 1122 of FIG. 11A.

At 1104, tokenizing is performed with the newline character as the tokenizer delimiter. This is in addition to the approach of using the other delimiters that were previously described (such as a blank space delimiter). Thus, it creates a number of subsets of data.

Each data subset is thereafter processed at 1106. At 1108, classification is performed to group the log data into groupings for the log data having sufficient similarities. Thereafter, at 1110, post-processing and generation of results are provided to the system user.

Figure 12:
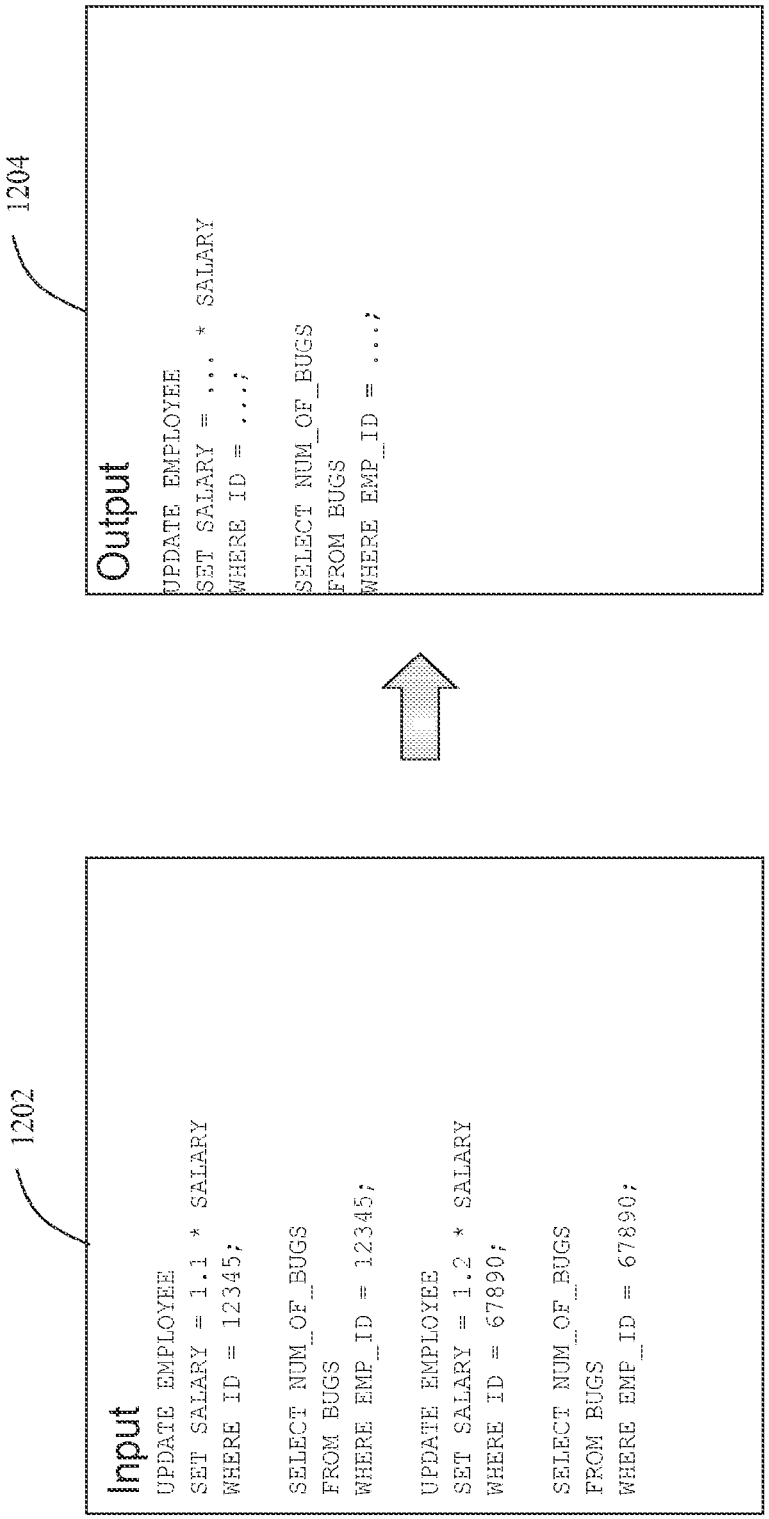
FIG. 12 illustrates an application where the input comprises sets of SQL code, and the output comprises a processed version of the SQL that has been grouped together.

The embodiments of the invention can also be used to catalog SQL workloads and to perform workload classification. FIG. 12 illustrates this application, where the input 1202 comprises sets of SQL code, and the output 1204 comprises a classified version of the SQL that has been grouped together.

Figure 13:
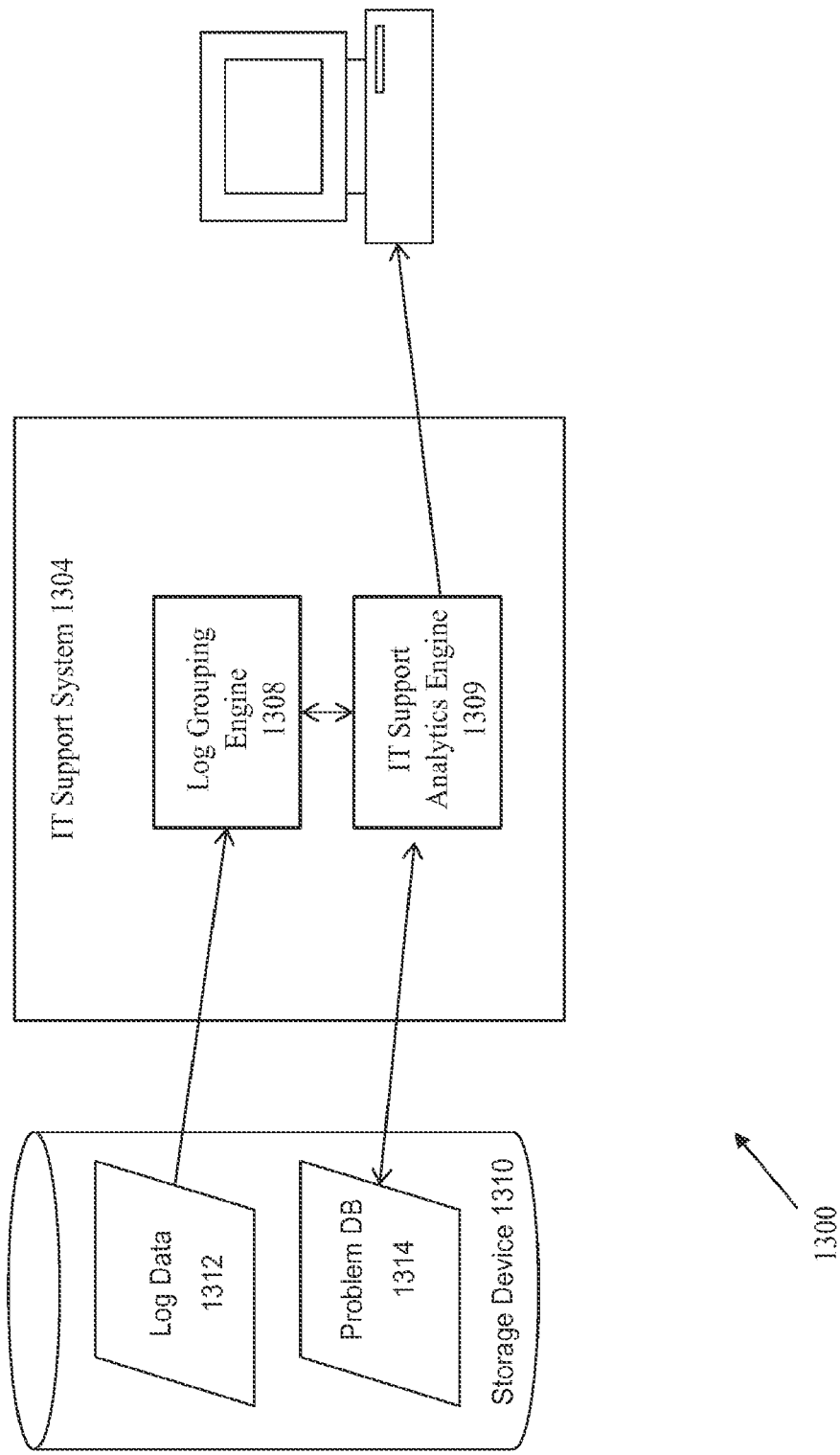
FIG. 13 illustrates a system that embodies an application of an embodiment of the invention for IT support purposes.

FIG. 13 illustrates a system 1300 that embodies an advantageous application of an embodiment of the invention for IT support purposes. Here, a storage device 1310 is maintained to hold log records 1312. A problem database 1314 can also be maintained to hold historical information regarding previous problem scenarios and associated problem resolutions. This problem DB 1314 can include, for example, message signatures and related notes, comments, prior resolutions, and a set of expert systems data related to problem resolutions. The DB 1314 can include information populated form any suitable source. In one situation, the DB 1314 is updated when a problem is resolved, and is associated with the pattern/message signature so that future occurrences can be addressed the same way. In addition, the original development/testing team for a product may be the source of at least part of the knowledgebase within DB 1314.

The IT support system 1304 may include a log grouping engine 1308 to group and classify the log records 1312. The log grouping engine 1308 implements the functions described above to classify messages to identify and assign those messages into appropriate groups.

The IT support system 1304 can also include an IT support analytics engine 1309. This support engine is used by IT support personnel to address problems that may arise in the system, being administrated/supported by the support personnel. This analytics engine functions by identifying patterns within the log records 1312, and then matching those patterns within the problem DB 1314. To the extent the identified patterns pertain to a possible problem scenario, the database 1314 can then provide suggestions on how to address and correct the possible problem.

For example, consider the scenario when user complaints are received to indicate the presence of an operating or performance problem in the system. The support staff would operate the support system 1304 to analyze the relevant log records to check for the presence of patterns that correlate to known problems, and to then use a knowledgebase, expert system, or menu/recipe that may be associated with the known problem pattern to resolve the issue.

As another scenario, the support system can be used to perform forecasting, by using the system to check for patterns that are associated with known usage situations that will likely occur in the future. In this case, if the forecasted situation is a problem situation, then the support staff can take actions on a preemptive basis to anticipate and possibly correct the problem before it causes any outages or affects user experiences.

As yet another example situation, consider the situation where the system is used to check for anomalies in the operating environment. The log records are reviewed by the system and checked for the presence of any unexpected log messages or sequences of log messages. These detected anomalies may indicate the presence of an operating problem or a security breach that should be corrected by the support staff. It is noted that the process could be automated, in the sense that instead of a support staff (human being), an automated system could be implemented to provide the functionality discussed here.

Further details regarding an example log analytics system that can be used in conjunction with embodiments of the invention are disclosed in U.S. Provisional Application No. 62/142,987, filed on Apr. 3, 2015, which is hereby incorporated by reference in its entirety.

The above description was provided in the context of one possible type of processing where the actions are performed in a batch/offline mode. In this mode, all of the input is provided in one batch, and processing then returns the output back.

An alternate approach is to perform the processing in an online mode. In this new approach, all the input log data is not necessarily provided in one batch. Instead, the groupings may be performed in an incremental fashion, where log records are provided one by one, as they arrive at the system. For every new log record, the system finds whether it belongs to an existing group, or whether a new group needs to be created and to use this record as a sample. Every time a new record is assigned into an existing group, the system updates the count and possibly the signature. There are several applications/advantages for the online approach. For example, one can use it in order to classify log records while they are coming into the system. This is different from the offline approach, where the classification tasks may be run upon request.

Therefore, what has been described is an improved system, method, and computer program product for analyzing sets of data in an efficient manner, such that analytics can be effectively performed over that data. In some embodiments, classification operations are performed to generate groups of similar log records. This permits classification of the log records in a cohesive and informative manner. In addition, group-based delta operations can be performed over the groups of the log data to detect differences and similarities between the different groups of data. Subsequences can also be identified within the set of grouped data. Various types of analytics can be applied to the classified data.

System Architecture Overview

Figure 14:
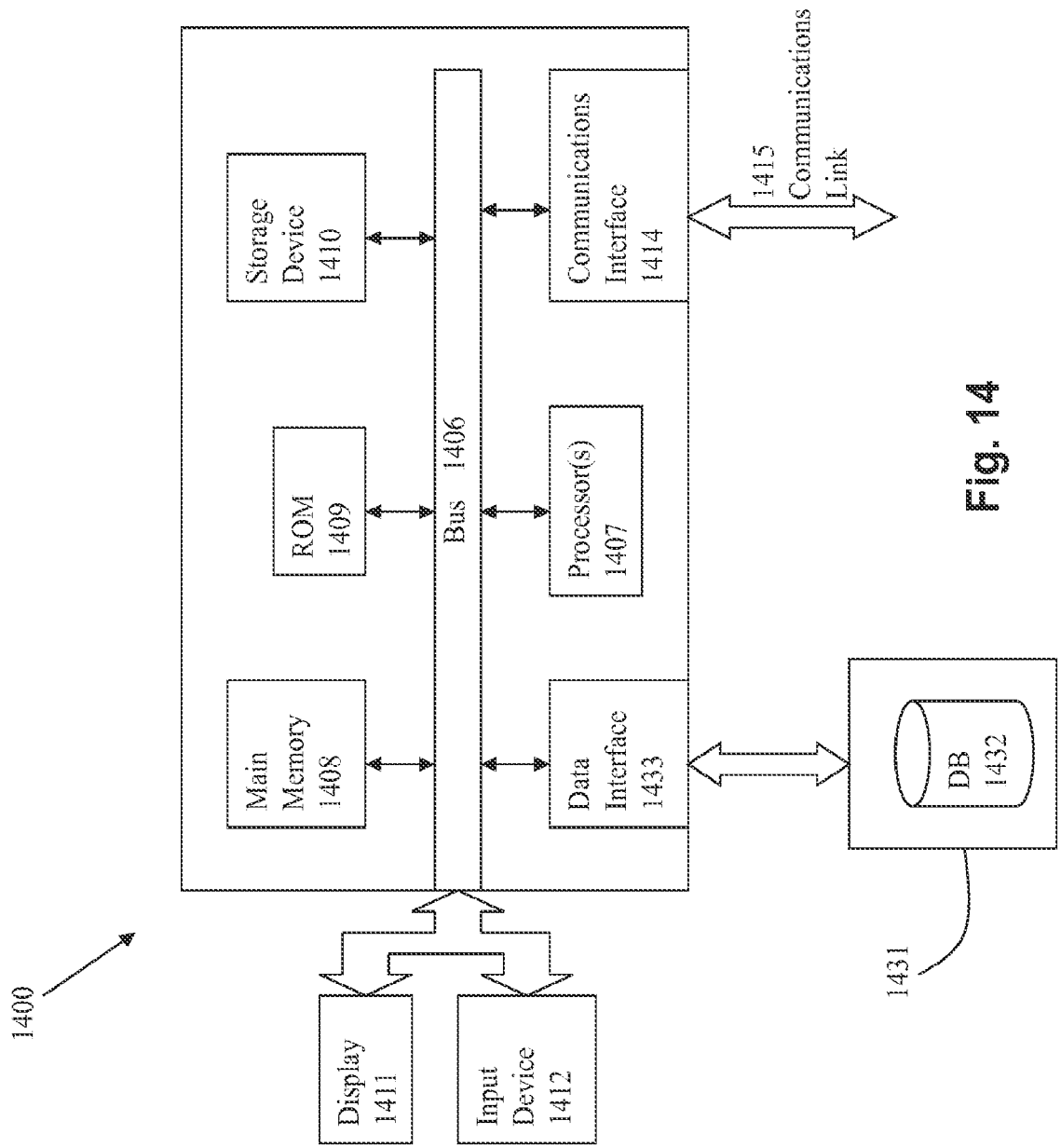
FIG. 14 shows an architecture of an example computing system with which the invention may be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method comprising:
    identifying a plurality of groups of messages, wherein a group of messages within the plurality of groups of messages defines a sequence for messages associated with the group;
    identifying a first set of one or more subsequences of messages based at least in part on a frequency with which the first set of one or more subsequences occurs in different groups of the plurality of groups of messages; and
    performing at least one operation based on the first set of one or more subsequences of messages, wherein performing the at least one operation comprises presenting at least one of a trend or context for the plurality of groups of messages based at least in part on the first set of one or more subsequences of messages.

2. The method of claim 1, wherein identifying the first set of one or more subsequences comprises applying a sliding window to the plurality of groups of messages.

3. The method of claim 2, wherein the sliding window has a size that is defined based at least in part on user input.

4. The method of claim 2, wherein applying the sliding window comprises generating a hash code for different subsequences of messages for varying offsets of the sliding window.

5. The method of claim 1, wherein the first set of one or more subsequences of messages only includes subsequences of messages that satisfy a minimum frequency threshold.

6. The method of claim 1, wherein the first set of one or more subsequences of messages include a set of top subsequences of messages sorted by frequency.

7. The method of claim 1, wherein performing the at least one operation comprises detecting an anomaly on the one or more computing systems based at least in part on the first set of one or more subsequences of messages; and responsive to detecting the anomaly, triggering an alert.

8. The method of claim 1, wherein the plurality of groups of messages comprise groups of uniform resource locators (URLs); the method further comprising assigning a classification to a set of URLs based on the first set of one or more subsequences of messages.

9. The non-transitory computer-readable medium of claim 8, wherein performing the at least one operation comprises detecting an anomaly on the one or more computing systems based at least in part on the first set of one or more subsequences of messages; and responsive to detecting the anomaly, triggering an alert.

10. The non-transitory computer-readable medium of claim 8, wherein the plurality of groups of messages comprise groups of uniform resource locators (URLs); the operations further comprising assigning a classification to a set of URLs that are part of the combined group of messages.

11. A non-transitory computer-readable medium having stored thereon a sequence of instructions which, when executed by a processor causes the processor to execute operations comprising:
    identifying a plurality of groups of messages, wherein a group of messages within the plurality of groups of messages defines a sequence for messages associated with the group;
    identifying a first set of one or more subsequences of messages based at least in part on a frequency with which the first set of one or more subsequences occurs in different groups of the plurality of groups of messages; and
    performing at least one operation based on the first set of one or more subsequences of messages, wherein performing the at least one operation comprises presenting at least one of a trend or context for the plurality of groups of messages based at least in part on the first set of one or more subsequences of messages.

12. The non-transitory computer-readable medium of claim 11, wherein identifying the first set of one or more subsequences comprises applying a sliding window to the plurality of groups of messages.

13. The non-transitory computer-readable medium of claim 12, wherein the sliding window has a size that is defined based at least in part on user input.

14. The non-transitory computer-readable medium of claim 12, wherein applying the sliding window comprises generating a hash code for different subsequences of messages for varying offsets of the sliding window.

15. The non-transitory computer-readable medium of claim 11, wherein the first set of one or more subsequences of messages only includes subsequences of messages that satisfy a minimum frequency threshold.

16. The non-transitory computer-readable medium of claim 11, wherein the first set of one or more subsequences of messages include a set of top subsequences of messages sorted by frequency.

17. A system, comprising:
    a processor;
    a memory having stored thereon a sequence of instructions which, when executed by a processor causes the processor to execute operations comprising:
        identifying a plurality of groups of messages, wherein a group of messages within the plurality of groups of messages defines a sequence for messages associated with the group;

identifying a first set of one or more subsequences of messages based at least in part on a frequency with which the first set of one or more subsequences occurs in different groups of the plurality of groups of messages; and performing at least one operation based on the first set of one or more subsequences of messages, wherein performing the at least one operation comprises presenting at least one of a trend or context for the plurality of groups of messages based at least in part on the first set of one or more subsequences of messages.

18. The system of claim 17, wherein identifying the first set of one or more subsequences comprises applying a sliding window to the plurality of groups of messages.

* * * * *

UNITED STATES PATENT AND TRADEMARK OFFICE
CERTIFICATE OF CORRECTION

Page 1 of 1

PATENT NO. : 11,734,315 B2
APPLICATION NO. : 17/379887
DATED : August 22, 2023
INVENTOR(S) : Morfonios et al.

It is certified that error appears in the above-identified patent and that said Letters Patent is hereby corrected as shown below:

In the Specification

In Column 3, Line 42, delete "free" and insert -- free. --, therefor.

In Column 3, Line 45, delete "bytes" and insert -- bytes. --, therefor.

In Column 3, Line 49, delete "bytes" and insert -- bytes. --, therefor.

In Column 3, Line 52, delete "free" and insert -- free. --, therefor.

In Column 3, Line 58, delete "free" and insert -- free. --, therefor.

In Column 3, Line 59, delete "bytes" and insert -- bytes. --, therefor.

In Column 18, Line 65, delete "PTSN," and insert -- PSTN, --, therefor.

Signed and Sealed this
Fourth Day of March, 2025

Coke Morgan Stewart
*Acting Director of the United States Patent and Trademark Office*